(12) United States Patent
Dehlin et al.

(10) Patent No.: US 7,479,950 B2
(45) Date of Patent: *Jan. 20, 2009

(54) MANIPULATING ASSOCIATION OF DATA WITH A PHYSICAL OBJECT

(75) Inventors: Joel P. Dehlin, Redmond, WA (US); Steven M. Drucker, Bellevue, WA (US); Curtis Glenn Wong, Bellevue, WA (US); Asta J. Roseway, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/102,236

(22) Filed: Apr. 14, 2008

(65) Prior Publication Data

US 2008/0231609 A1 Sep. 25, 2008

Related U.S. Application Data

(63) Continuation of application No. 10/994,899, filed on Nov. 22, 2004, now Pat. No. 7,358,962, which is a continuation-in-part of application No. 10/867,876, filed on Jun. 15, 2004, now abandoned.

(51) Int. Cl.
*G06F 3/041* (2006.01)
(52) U.S. Cl. ....................................... 345/173; 345/156
(58) Field of Classification Search ................. 345/156, 345/173, 589
See application file for complete search history.

(56) References Cited

U.S. PATENT DOCUMENTS

| | | | | |
|---|---|---|---|---|
| 6,084,590 A | * | 7/2000 | Robotham et al. | 345/419 |
| 6,764,185 B1 | * | 7/2004 | Beardsley et al. | 353/122 |
| 2005/0245302 A1 | * | 11/2005 | Bathiche et al. | 463/1 |
| 2005/0251800 A1 | * | 11/2005 | Kurlander et al. | 717/174 |
| 2006/0001645 A1 | * | 1/2006 | Drucker et al. | 345/156 |
| 2006/0001650 A1 | * | 1/2006 | Robbins et al. | 345/173 |
| 2006/0007124 A1 | * | 1/2006 | Dehlin | 345/156 |
| 2006/0092170 A1 | * | 5/2006 | Bathiche et al. | 345/589 |

* cited by examiner

*Primary Examiner*—Ricardo L Osorio
(74) *Attorney, Agent, or Firm*—Workman Nydegger

(57) ABSTRACT

Data elements stored in a computing system and associated with a physical object are reassociated with the same or another physical object. An identifying characteristic presented by the physical object, such as a reflective pattern applied to the object, is detected when the object is positioned adjacent to the interactive display surface. Images or other files associated with the identifying characteristic are accessed and displayed on the interactive display surface. A gesture by a user adjacent to the interactive display surface is detected to reassociate a selected representation. For example, the user can change where the selected element fits in a sequence of data elements, or reassociate the selected element with a second object placed on the interactive display surface. In a networked environment, the reassociated element can be stored on a server and subsequently accessed from a different interactive surface via the network using the second physical object.

20 Claims, 15 Drawing Sheets

MANIPULATING ASSOCIATION OF DATA WITH A PHYSICAL OBJECT

CROSS-REFERENCE TO RELATED APPLICATIONS

This application is a continuation of patent application Ser. No. 10/994,899 filed Nov. 22, 2004, entitled MANIPULATING ASSOCIATION OF DATA WITH A PHYSICAL OBJECT, which is a continuation-in-part of a copending patent application Ser. No. 10/867,876 filed on Jun. 15, 2004, entitled MANIPULATING ASSOCIATION OF DATA WITH A PHYSICAL OBJECT the benefit of the filing date of which is hereby claimed under 35 U.S.C. § 120.

FIELD OF THE INVENTION

The present invention generally pertains to a computing system having an interface surface operable to recognize physical objects in proximity to the interface surface, and, more specifically, to exploiting the object recognition capability of the interface surface to reassociate the data elements displayed on the interface surface based on user movements.

BACKGROUND OF THE INVENTION

One of the principal advantages of computers is the ease with which computers enable users to change and revise files. Before computers were available for word processing, making changes in a document involved, at a minimum, physically cutting and pasting together usable sections; at worst, changing a document involved someone having to retype the entire document. Using a computer, a document or other content stored on a computer can be retrieved, the changes desired can be made using an appropriate editing program, and the document can then be saved once again.

As is well known, computers have become increasingly more powerful and easier to use. For example, computers are easily connected in communication with other computers over local area networks and wide area networks, such as the Internet. As a result, it is possible for users to share documents and other information using different computers that can be thousands of miles apart from one another.

With the evolution of computing systems, retrieving, revising, and saving data have become easier. Not long ago, to retrieve a document or other object, a user had to remember a specific function key or other key string that should be pressed to initiate a retrieval command. Once the command was entered, the user either had to remember and key in the name of the data file or review a listing of the names of documents available on a storage device until the desired data file was found. Also, prior to the proliferation of graphical user interface operating systems, file names were typically limited to eight characters. Thus, merely trying to identify a desired file for retrieval was not a simple matter.

Once a file was retrieved, the user was able to make changes to the file, but again, the user typically had to remember the specific function keys or other key-strings designated for initiating particular commands. Because of the numerous permutations and combinations of the SHIFT, ALT, and CTRL keys, and the function keys that might have to be used to enter commands in revising a document, users commonly relied upon keyboard overlay templates that listed all the available commands associated with each key or keystroke combination. Saving the revised document also required similar, non-user friendly processes.

Fortunately, the development of graphical user interface-driven operating systems has made retrieving, revising, and storing files much simpler. Instead of employing cryptic commands, users can readily retrieve and manipulate documents using a mouse or other pointing devices to point, click, and drag documents between storage directories. Combining these easier-to-use interfaces with local area networks and wide area networks that can access a common storage has made sharing files locally or over vast distances much simpler.

While the contrast between today's networked, graphical user interface-driven systems with the standalone, command-driven systems of recent decades makes the latter seem almost quaint by comparison, the evolution of computer technology continues. Just as graphical user interface-driven systems have improved human-machine interaction over predecessor systems, touch-screen devices, tablet PCs, and other developments may soon render the users' dependence upon pointing devices seem even more antiquated.

For example, the MIT Media Lab, as reported by Brygg Ullmer and Hiroshi Ishii in "The metaDESK: Models and Prototypes for Tangible User Interfaces," *Proceedings of UIST 10/1997*:14-17," has developed another form of "keyboardless" machine interface. The metaDESK includes' a generally planar graphical surface that not only displays computing system text and graphic output, but also receives user input by recognizing objects placed against the graphical surface. The combined object recognition and display capability of the graphical surface of the metaDESK is facilitated using infrared (IR) lamps, an IR camera, a video camera, a video projector, and mirrors disposed beneath the surface of the metaDESK. The mirrors reflect the graphical image projected by the projector onto the underside of the graphical display surface to provide images that are visible to a user from above the graphical display surface. The IR camera can detect IR reflections from the undersurface of the objects placed on the graphical surface.

Others have been developing similar keyboardless interfaces. For example, papers published by lun Rekimoto of the Sony Computer Science Laboratory, kic., and associates describe a "HoloWall" and a "HoloTable" that display images on a surface and use IR light to detect objects positioned adjacent to the surface.

Although inventions such as the metaDESK respond to objects disposed on a graphical display surface, the metaDESK responds to the contemporaneous placement and movement of the objects on the display surface to carryout predefined functions, such as displaying or moving the display of a map of the MIT campus. Users of computer systems also need to be able to manipulate and reassociate data files such that the modified and reassociated files can be easily retrieved and/or shared with others locally or across a distance. Thus, it would be desirable to provide an intuitive, user-friendly manner to use an object to engage an interactive display surface so as to manipulate and store data. The prior art has used objects on a display surface for simply accessing data associated with an object, such as the map data that are displayed by the metaDESK when a specific object is placed on the display surface.

SUMMARY OF THE INVENTION

One of the advantages of the present invention is that it provides a simple way to reassociate data elements represented on an interactive display surface. Data elements are associated with a physical object identifiable by the interactive display surface. The data elements can be reassociated with the same physical object or with another physical object. Thus, a user can associate data elements, such as documents and/or photographs with physical objects. When the physical object is subsequently placed on the interactive display surface, the associated or reassociated data elements are readily retrieved from storage.

One aspect of the present invention is thus directed to a method for reassociating data elements stored in a computing system and associated with a physical object with the same or another physical object. An identifying characteristic presented by the physical object is read when the object is positioned on the interactive display surface. Data elements associated with the identifying characteristic are accessed, and representations of the data elements are presented on the interactive display surface. A user movement made adjacent to the interactive display surface indicating a user command to reassociate a selected representation is detected, and the data element corresponding to the selected representation is reassociated. The reassociation of the data element is visually confirmed by showing the selected representation being reassociated on the interactive display surface.

The characteristic preferably includes a light reflective identification disposed on a surface of the physical object. Accordingly, the step of reading the characteristic presented by the physical object includes the steps of transmitting infrared light through the interactive display surface, toward a face of the interactive display surface adjacent to which the physical object is disposed, and recognizing the characteristic presented by physical object by imaging infrared light reflected thereby.

Each of the data elements is represented by showing at least one of the content of the data element, a portion of the content of the data element, a name representing the data element, and an icon representing the data element. Furthermore, the manner of presenting the representation can be determined by a location where the physical object is placed adjacent to the interactive display surface. The location where the physical object is placed causes the data elements to be presented in one of a sort mode wherein the representation of each of the data elements is in a generally tabular fashion and sorted in regard to a defined parameter, a carousel mode wherein the representation of each of the data elements is presented in a sequentially-related list, and a show mode wherein the representation of each of the data elements is presented individually and sequentially.

The user movement can include either a hand gesture, a movement of a pointing object presenting a pointing identifier, or a movement of the physical object. In response to the user movement, the step of reassociating the data element corresponding to the selected representation is carried out and includes resequencing the data elements associated with the characteristic or reassociating the data with a second characteristic presented by a second physical object placed adjacent to the interactive display surface.

This latter functionality of the present invention further comprises the step of determining that the second characteristic is placed adjacent to a designated portion of the interactive display surface, thereby enabling the selected representation to be reassociated with the second characteristic. Reassociating the data element with the second characteristic includes either the step of copying the data from a first storage location associated with the characteristic to a second storage location associated with the second characteristic, or the step of moving the data from the first storage location associated with the characteristic to the second storage location associated with the second characteristic. The second characteristic is associated with either a local data storage coupled with the computing device associated with the interactive display surface or a remote data storage on a server accessible over a network such that the data elements associated with the second characteristic can be accessed via the interactive display surface and a second interactive display surface in communication with the remote data storage on the server.

The step of showing the selected representation being reassociated on the interactive display surface preferably includes the step of presenting a reassociation animation between the selected representation and a reassociation point. The reassociation animation can depict the reassociation point pulling the selected representation into the reassociation point, the selected representation vanishing into the reassociation point, the selected representation shrinking into the reassociation point, or the selected representation curving into the reassociation point. In another step of the method, a type of user movement for reassociating the data element is identified so that the reassociation animation presented depends on the type of user movement.

In accordance with other aspects of the present invention, an opening animation is performed visually indicating the emergence of the representations from an entry point associated with the characteristic. The method can include the step of enabling a user to provide an undo command, and in response to detecting the undo command, the method includes the step of undoing the reassociating of the data element. Another step provides for detecting when the characteristic is no longer adjacent to the interactive display surface, and correspondingly, disabling a capability for reassociating the data elements associated with the characteristic.

Another aspect of the present invention is directed to a memory medium having machine executable instructions stored for carrying out the steps of the method described above. Still another aspect of the present invention is directed to a system that has a processor and a memory that stores data and machine instructions, which when executed by the processor, cause it to carry out functions in connection with an interactive display surface that are generally consistent with the steps of the method. The interactive display surface includes

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIGS. 7A-7F are illustrations of the interactive display surface showing animations confirming reassociation of a data element with a physical object in response to different user movements used in reassociating the data elements;

DESCRIPTION OF THE PREFERRED EMBODIMENT

Exemplary Computing System for Implementing Present Invention

Figure 1:
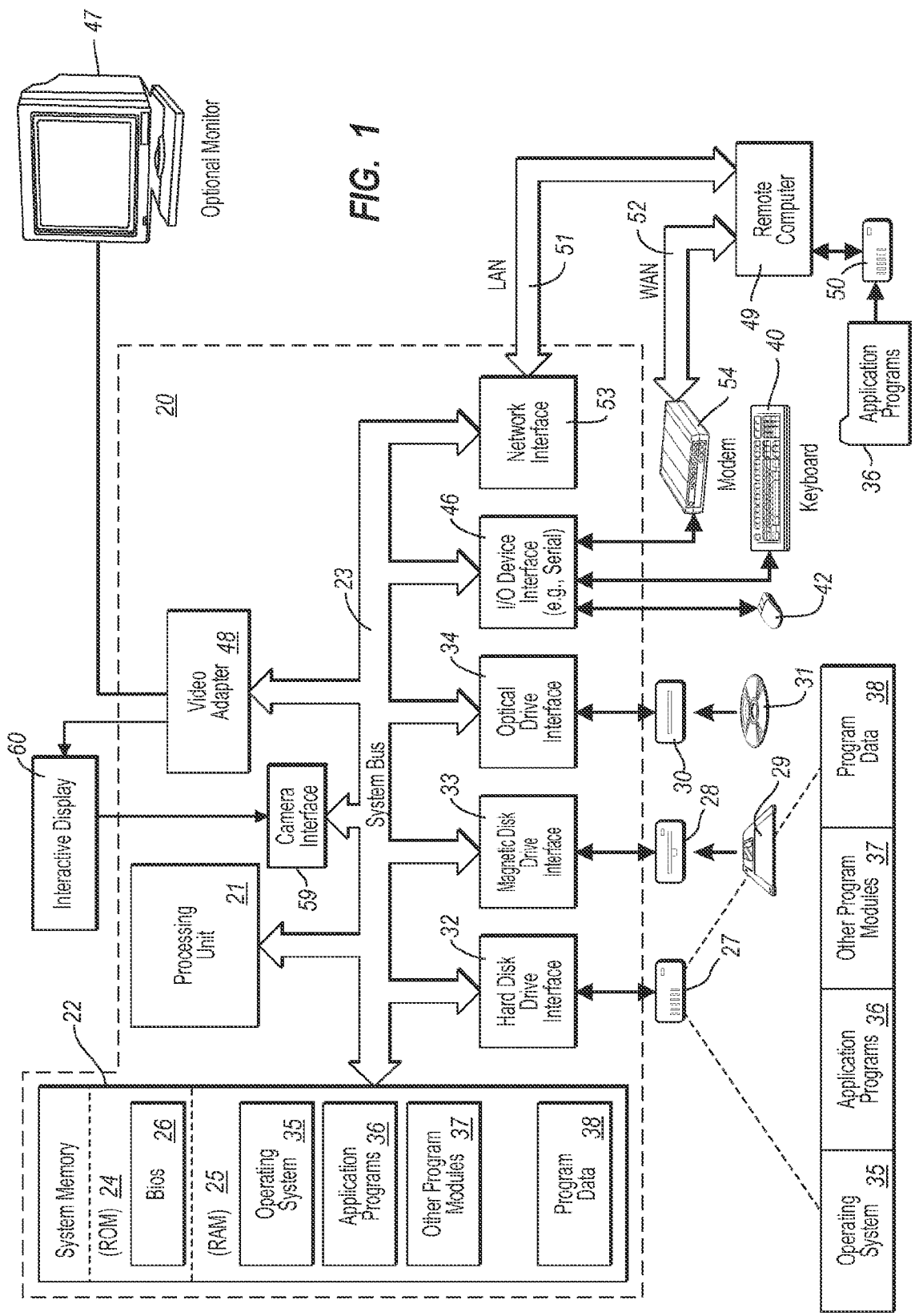
FIG. 1 is a functional block diagram of a generally conventional computing device or personal computer (PC) that is suitable for image processing for the interactive display surface as used in practicing the present invention.

With reference to FIG. 1, an exemplary system suitable for implementing various portions of the present invention is shown. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic—disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals form a digital video camera that is included therein, as discussed below. The digital video camera may be instead coupled to an appropriate serial I/O port, such as to a USB version 2.0 port. Optionally, a monitor 47 can be connected to system bus 23 via an appropriate interface, such as a video adapter 48; however, the interactive display table of the present invention can provide a much richer display and interact with the user for input of information and control of software applications and is therefore preferably coupled to the video adaptor. It will be appreciated that PCs are often coupled to other peripheral output devices (not shown), such as speakers (through a sound card or other audio interface—not shown) and printers.

The present invention may be practiced on a single machine, although PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Exemplary Interactive Surface

Figure 2:
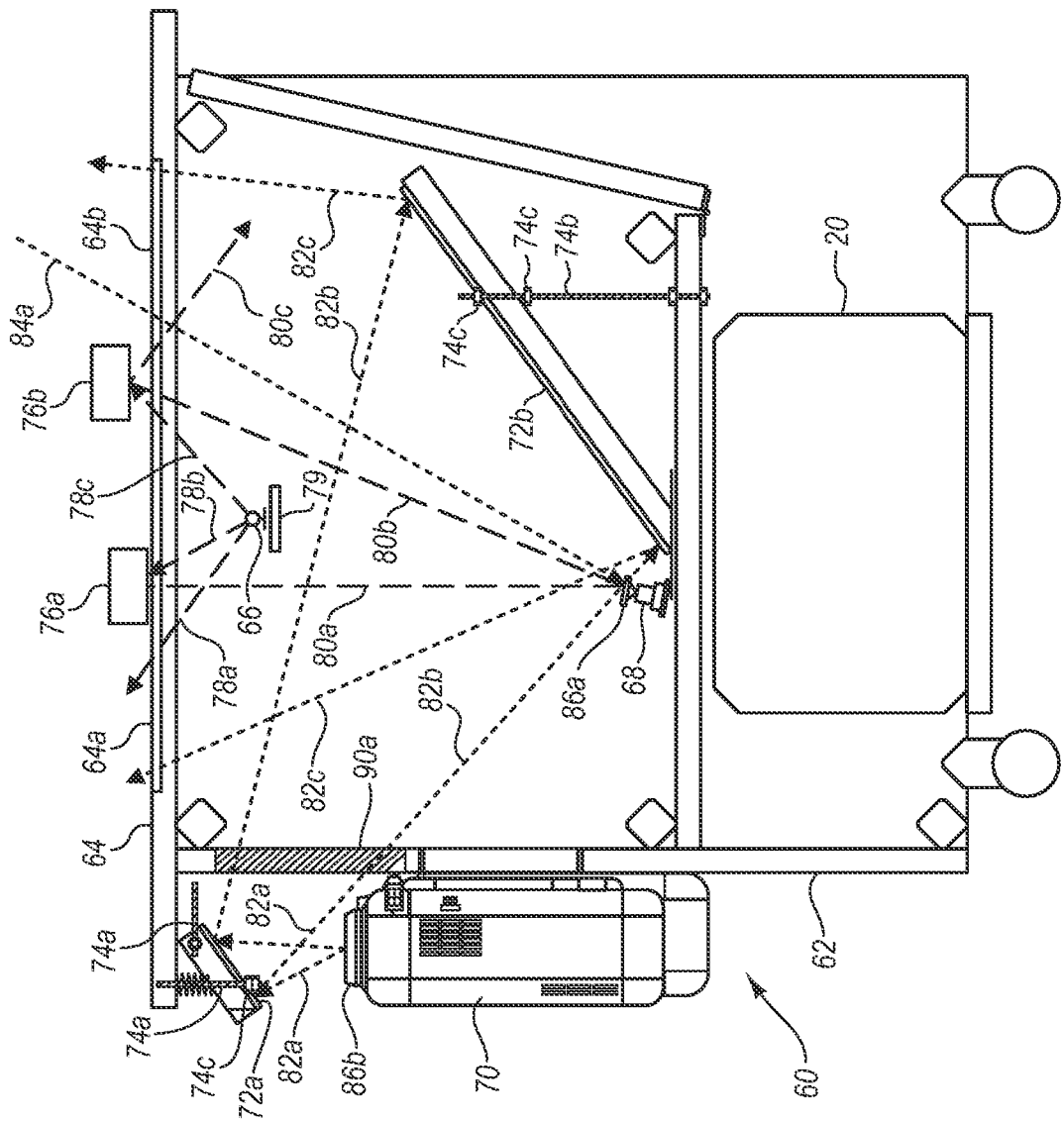
FIG. 2 is a cross-sectional view illustrating internal components of an interactive display surface in the form of an interactive table.

In FIG. 2, an exemplary interactive display table 60 is shown that includes the PC 20 within a frame 62 and which serves as both an optical input and video display device for the computer. In this cut-away figure of the interactive display table 60, rays of light 82a-82c used for displaying text and graphic images are generally illustrated using dotted lines, while rays of infrared (IR) light used for sensing objects on or just above a display surface 64a of the interactive display table 60 are illustrated using dash lines. The display surface 64a is set within an upper surface 64 of interactive display table 60. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. Although only one IR source 66 is shown, it will be appreciated that a plurality of such IR sources may be mounted at spaced-apart locations around the interior sides of frame 62 to prove an even illumination of display surface 64a. The infrared light produced by the IR sources may:

exit through the table surface without illuminating any objects, as indicated by dash line 78a;

illuminate objects on the table surface, as indicated by dash line 78b; or illuminate objects a short distance above the table surface but not touching the table surface, as indicated by dash line 78c.

Objects above display surface 64a include a "touch" object 76a that rests atop the display surface and a "hover" object 76b that is close to but not in actual contact with the display surface. As a result of using translucent layer 64b under the display surface to diffuse the IR light passing through the display surface, as an object approaches the top of display surface 64a, the amount of IR light that is reflected by the object increases to a maximum level that is achieved when the object is actually in contact with the display surface.

A digital video camera 68 is mounted to frame 62 below display surface 64a in a position appropriate to receive IR light that is reflected from any touch object or hover object disposed above display surface 64a. Digital video camera 68 is equipped with an IR pass filter 86a that transmits only IR light and blocks ambient visible light traveling through display surface 64a along dotted line 84a A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a and corresponds to an image of IR light reflected from objects on or above the display surface. It will be apparent that digital video camera 68 will also respond to any IR light included in the ambient light that passes through display surface 64a from above and into the interior of the interactive display (e.g., ambient IR light that also travels along the path indicated by dotted line 84a).

IR light reflected from objects on or above the table surface may be:

reflected back through translucent layer 64b, through IR pass filter 86a and into the lens of digital video camera 68, as indicated by dash lines 80a and 80b; or reflected or absorbed by other interior surfaces within the interactive display without entering the lens of digital video camera 68, as indicated by dash line 80c.

Translucent layer 64b diffuses both incident and reflected IR light. Thus, as explained above, "hover" objects that are closer to display surface 64a will reflect more IR light back to digital video camera 68 than objects of the same reflectivity that are farther away from the display surface. Digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm) may be above the table while another portion (such as the user's finger) is in contact with the display surface. In addition, an object may include an IR light reflective pattern or coded identifier (e.g., a bar code) on its bottom surface that is specific to that object or to a class of related objects of which that object is a member. Accordingly, the imaging signal from digital video camera 68 can also be used for detecting each such-specific object, as well as determining its orientation, based on the IR light reflected from its reflective pattern, in accord with the present invention. The logical steps implemented to carry out this function are explained below.

Figure 3:
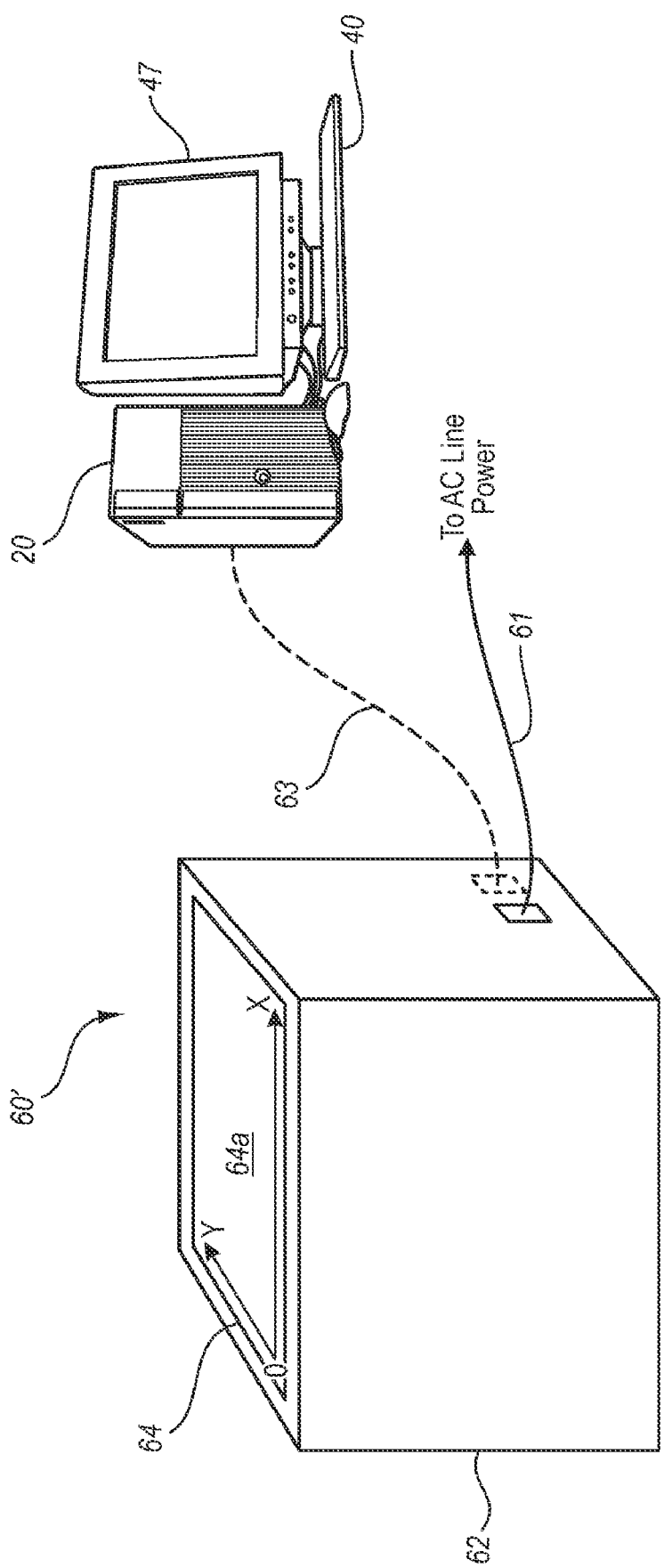
FIG. 3 is an isometric view of an embodiment in which the interactive table is connected to an external PC.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). As also shown in this Figure, a set of orthogonal X and Y axes are associated with display surface 64a, as well as an origin indicated by "O." While not discretely shown, it will be appreciated that a plurality of coordinate locations along each orthogonal axis can be employed to specify any location on display surface 64a.

If the interactive display table is connected to an external PC 20 (as in FIG. 3) or to some other type of external computing device, such as a set top box, video game, laptop computer, or media computer (not shown), then the interactive display table comprises an input/output device. Power for the interactive display table is provided through a power lead 61, which is coupled to a conventional alternating current (AC) source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, the interactive display table might also be connected to a computing device such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to use the more intuitive user interface functionality of interactive display table 60 to good advantage, as well as executing other software applications that are not specifically designed to make use of such functionality, but can still make good use of the input and output capability of the interactive display table.

An important and powerful feature of the interactive display table (i.e., of either embodiments discussed above) is its ability to display graphic images or a virtual environment for games or other software applications and to enable an interaction between the graphic image or virtual environment visible on display surface 64a and identify objects that are resting atop the display surface, such as an object 76a, or are hovering just above it, such as an object 76b.

Again referring to FIG. 2, interactive display table 60 includes a video projector 70 that is used to display graphic images, a virtual environment, or text information on display surface 64a. The video projector is preferably of a liquid crystal display (LCD) or digital light processor (DLP) type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. Video projector 70 projects light along dotted path 82a toward a first mirror assembly 72a. First mirror assembly 72a reflects projected light from dotted path 82a received from video projector 70 along dotted path 82b through a transparent opening 90a in frame 62, so that the reflected projected light is incident on a second mirror assembly 72b. Second mirror assembly 72b reflects light from dotted path 82b along dotted path 82c onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b to enable a longer focal length (and lower cost) projector lens to be used with the projector.

Representations of Data Elements Associated with Physical Objects and Placement

Figure 4A:
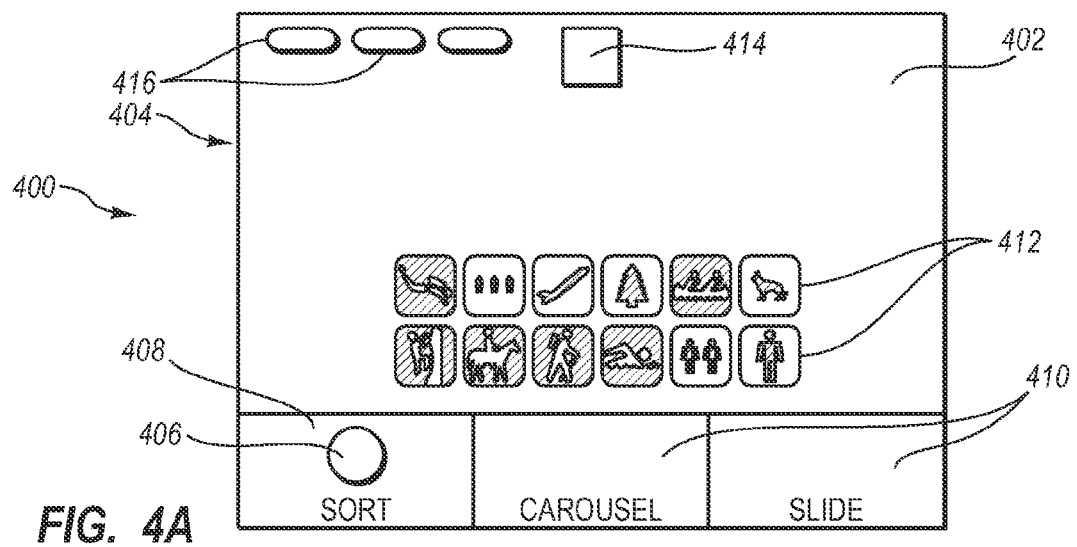
FIGS. 4A-4C illustrate different modes of the interactive display surface in presenting representations of data elements associated with a physical object.

In FIG. 4A, an illustration 400 shows an exemplary environment 402 of an interactive display surface 404 of a computer system (not shown) executing a sorting application. Interactive display surface 404 supports a plurality of interactive applications including, for example, the sorting application, and other applications including, but not limited to, carousel and slideshow applications described below.

The sorting application accesses data elements associated with a physical object 406. Physical object 406 is disposed in a sort area 408 on interactive display surface 404, sort area 408 being one of a plurality of application selection areas 410 presented by interactive display surface 404. Placement of physical object 406 in sort area 408 directs interactive display surface 404 to enter a sort mode, although placement of physical object 406 is only one manner in which modes are controllable. Icons, keypads, pointing devices, and other means of input may be used to control the operating mode of interactive display surface 404.

In addition, placement of physical object 406 may not only control a mode of operation, but also may control a manner in which the contents of data elements are represented. For one example, in a sort mode where the data elements consist of stored images, a portion of each image may be displayed on interactive display surface 404. On the other hand, in a slide show mode that will be described below in connection with FIG. 4C, the entire image may be displayed.

Data elements associated with physical object 406 are accessed by interactive display surface 404 identifying a characteristic presented by physical object 406. The characteristic is presented by a shape and/or a resulting general reflectivity, or by a light-responsive identification disposed on a surface of the physical object. Inventions describing how such characteristics and/or identifications are described in co-pending U.S. patent applications including application Ser. No. 10/813,855, entitled "Template Matching On Interactive Surface," application Ser. No. 10/814,577 entitled "Identification Of Object On Interactive Display Surface By Identifying Coded Pattern," and application Ser. No. 10/814,761 entitled "Determining Connectedness And Offset Of 3D Objects Relative To An Interactive Surface," all of which were filed on Mar. 31, 2004.

In sort mode of environment 402, representations 412 are generated to represent data elements being sorted. Representations 412 include all or part of the contents of the data element, a name or icon representing the content of the data element, or another representation. In environment 402, representations 412 include images stored as data elements and associated with physical object 406. The data elements represented in illustration 400 include only images; however, data elements could include text documents, spreadsheet files, and other types of files, as well. Contents of these elements are similarly representable by showing all or part of the content thereof, for example, at least a first page or first line of a document, a name of the document, an icon representing the document, a thumbnail, or another representation.

The sort mode shown is configured for representations 412 to be sorted between physical object 406 and a second physical object 414 with which data elements depicted by representations 412 will be reassociated, as will be further described below. Once reassociated, data elements depicted by representations 412 will be accessible via second physical object 414, such as, by placing second physical object 414 in a desired application selection area 410. Second physical object 414 may be placed on interactive display surface 404 at the same time physical object 406 is present on interactive display surface 404. Alternatively, after representations 412 of data elements are retrieved using physical object 406, second physical object 414 may be placed on the interactive display surface for data elements depicted by representations 412 to be reassociated with second physical object 414.

Environment 402 also shows control icons 416 arrayed on interactive display surface 404. Control icons 416, which also will be described in more detail below, include icons generated on interactive display surface 404, providing access to functions such as "UNDO," "REDO," and "EXIT" that the user may wish to exercise in the course of the application. Control icons 416 depicted in illustration 400 represent only a few of the control icons, by way of example, that may be presented in connection with an application executing on interactive display surface 404.

As is familiar to users of many common computer programs, an "UNDO" function restores the application to a state existing before the last user change was made. Thus, for example, if a user reassociated a data element from physical object 406 to second physical object 414, but the user changed his or her mind, selecting the "UNDO" function would disassociate the data element from second physical object 414 and reassociate it with physical object 406. The "REDO" function, in effect, undoes an "UNDO" function. Thus, if a user had reassociated a data element from physical object 406 to second physical object 414, selected the "UNDO" function to disassociate the data element from second physical object 414 and reassociate it with physical object 406, then changed his of her mind again, choosing the "REDO" function would once again reassociate the selected data element from physical object 406 to second physical object 414. The "EXIT" function terminates execution of the application.

Figure 4B:
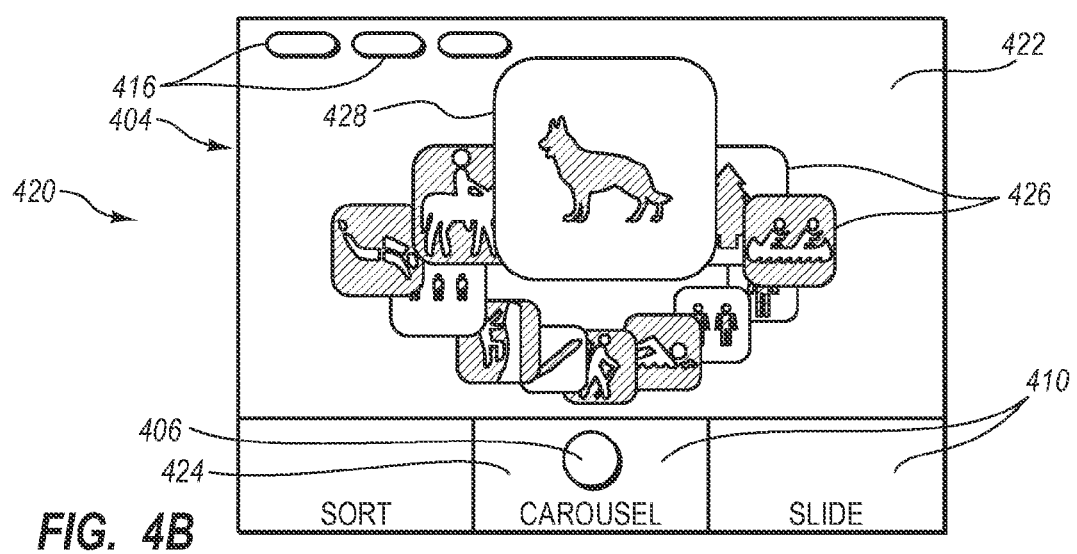

In FIG. 4B, an illustration 420 shows another exemplary environment 422 executing the carousel application. The carousel application, like the sort application, accesses data elements associated with physical object 406. Physical object 406 is disposed in a carousel area 424, which is one of the application selection areas 410 presented by interactive display surface 404. In the carousel mode of environment 422, representations 426 are generated to represent data elements with a principal representation 428 enlarged and highlighted. The carousel mode of environment 422 is well-suited to sequencing and re-sequencing representations 426 of data elements, including images for viewing in a slide show application described below. The carousel mode of environment 422 also enables sorting of documents or other data elements, such as might be done for including the data elements in a presentation or a compilation. The carousel mode of environment 422 also may include control icons 416 enabling a user to access "UNDO," "REDO," and "EXIT" functions that the user may wish to exercise in the course of the carousel application.

Figure 4C:
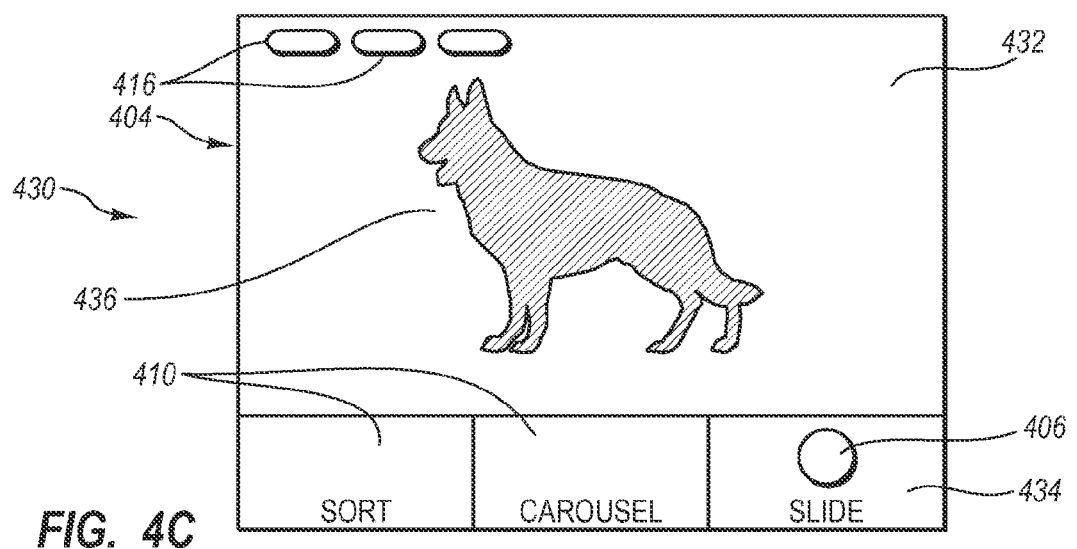

In FIG. 4C, an illustration 430 shows another exemplary environment 432 executing the slideshow application. The slideshow application is launched, among other possible alternatives, by moving physical object 406 into a slideshow area 434, which is one of the application selection areas 410 presented by interactive display surface 404. Once the slideshow application is launched, a single representation 436 of a single data element is presented for viewing or reviewing. Single representation 436 may be one of a plurality of representations associated with physical object 406 in the sort mode (FIG. 4A) and/or sequenced in the carousel mode (FIG. 4C). The slideshow mode of environment 432 also may include control icons 416, enabling a user to access "FORWARD," "BACKWARD," and "EXIT" functions to enable the user to move to the next representation, back to the last representation, or quit the application, respectively.

Reassociation of a Data Element with a Physical Object

Figure 5A:
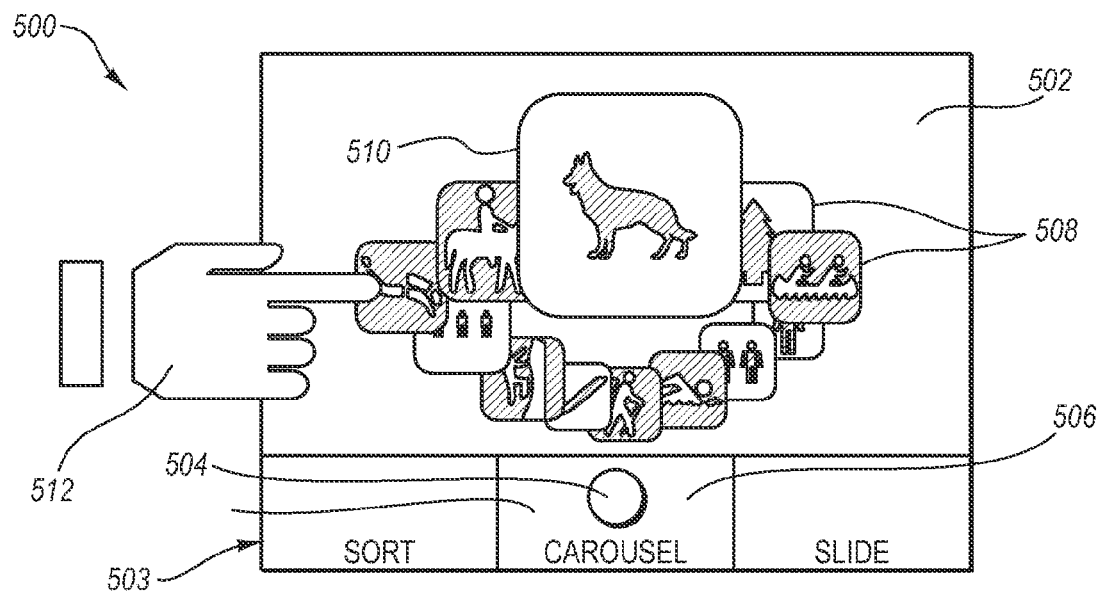
FIGS. 5A-5B are illustrations of the interactive display surface showing a user movement resequencing representations of data elements associated with a physical object.
Figure 5B:
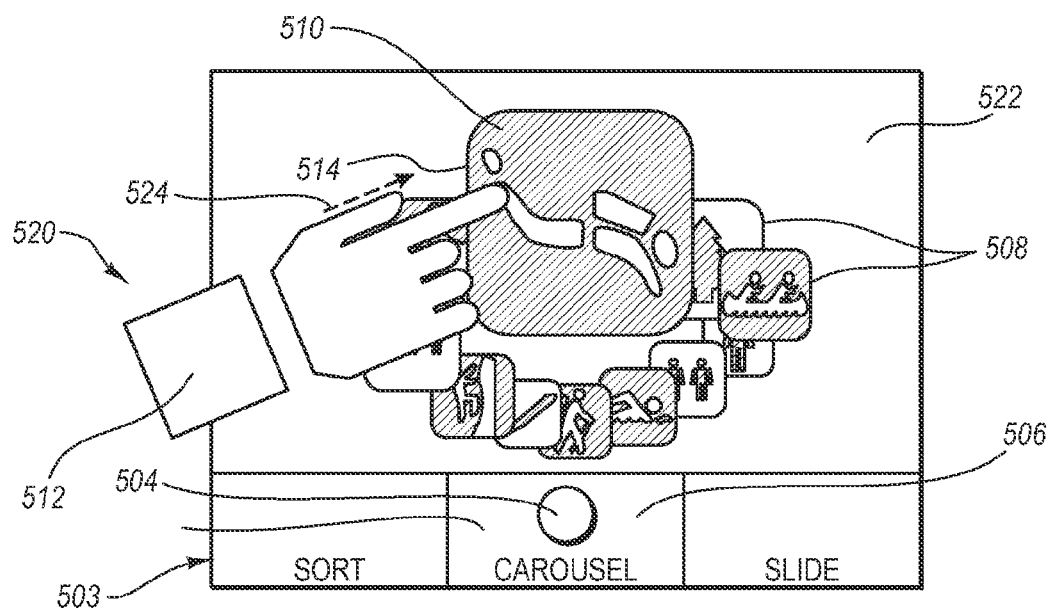

In accordance with embodiments of the present invention, data elements depicted as representations and associated with a physical object can be reassociated with the physical object or with a different physical object by user movements made adjacent the interactive display surface. FIGS. 5A and 5B show an embodiment of the present invention in which user movements are employed to enable the user to change associations of data-elements with a single physical object at a time. More particularly, FIGS. 5A and 5B show the user resequencing data elements in a carousel application (FIG. 4B), enabling a user to change how such data elements are presented in a slideshow application (FIG. 4C). One physical object may be used to access data elements, and then the data elements can be reassociated with a different physical object deployed in place of the original physical object, or the data elements associated with the original physical object may be rearranged, resequenced, or reassociated with the original physical object.

In FIG. 5A, an illustration 500 shows an environment 502 where a carousel mode is initiated on interactive display surface 503 by placement of a physical object 504 in a carousel area 506. The carousel mode causes representations 508 of data elements, which in this example consist of images, to be presented in a ring around a current principal representation position 510. In environment 502, a user can reassociate the data elements by resequencing the representations 508 depicting the data elements associated with physical object 504. To do, the user uses a hand 512 as a pointing object to select representation 514 to resequence it among representations 508. As described in connection with FIG. 10 below, other pointing objects besides a user's hand 512 may be used to manipulate association of representations and the data elements they depict. The user selects representation 514, in one embodiment of the present invention, by touching a finger to representation 514 or placing a finger sufficiently near to interactive display surface 503 so that the finger is detected as a hovering object based upon its IR light reflection.

In FIG. 5B, an illustration 520 shows a carousel environment 522 in which the user has resequenced representations 508 of data elements. After touching representation 514, the user drags representation 514, as indicated by an arrow 524, to a reassociation point, which correspond to current principal representation position 510. The reassociation point is among the data elements associated with physical object 504 and thus, reassociates the represented data element with the same physical object 504. As a result, the data elements associated with physical object 504 are reassociated by being resequenced.

Reassociation of a Data Element with a Different Physical Object

Figure 6A:
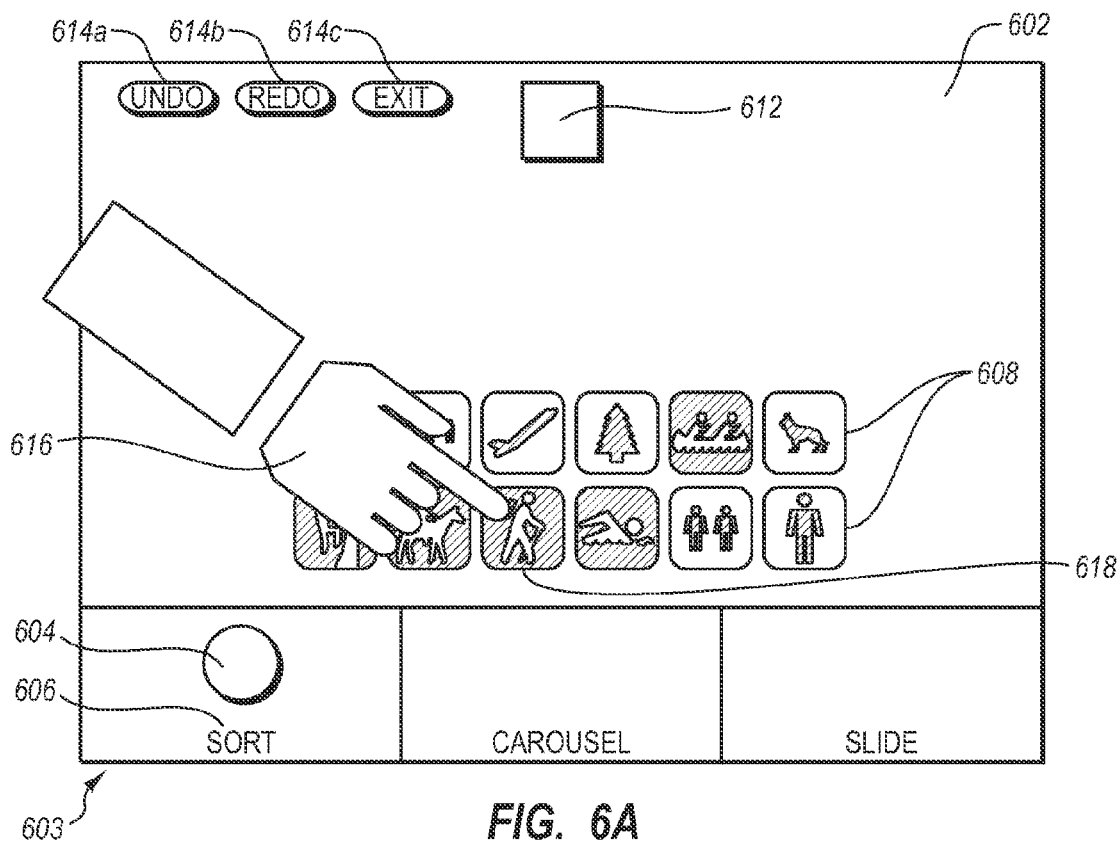
FIGS. 6A-6D are illustrations of the interactive display surface showing a user movement reassociating a representation of a data element previously associated with a first physical object with a second physical object.

Embodiments of the present invention allow data elements to be reassociated with a single physical object or reassociated between a plurality of physical objects, as shown in FIGS. 6A-6D. FIG. 6A shows a sort mode environment 602 initiated by placing a physical object 604 on an interactive display surface 603 in a sort area 606. The sort mode causes representations 608 of data elements, which in this example, consist of images, to be presented in a grid over interactive display surface 603. Also disposed on interactive display surface 603 is a second physical object 612 with which data elements will be reassociated. In one embodiment of the present invention, second physical object 612 can be disposed at any desired location on interactive display surface 603. However, in other embodiments of the invention, a designated area may be presented on interactive display surface 603 where second physical object 612 is to be placed in order to have data elements reassociated with second physical object 612. Control icons 614a, 614b, and 614c provide access to functions such as "UNDO," "REDO," and "EXIT," respectively, that the user may wish to exercise in the course of the application.

Figure 6B:
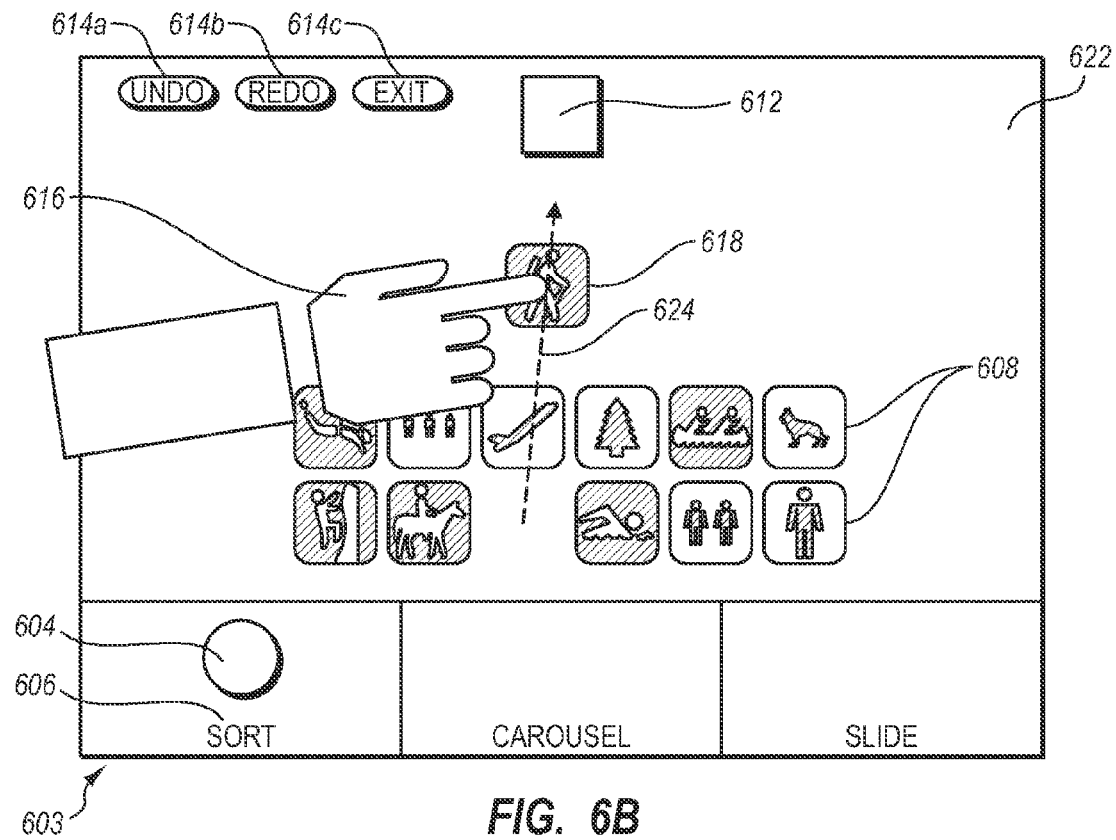

A user's hand 616 is illustrated reaching for a selected representation 618 that the user wishes to reassociate with second physical object 612. Analogous to FIGS. 5A-5B, to reassociate selected representation 618, the user touches selected representation 618 with the hand and moves selected representation 618 toward a selected reassociation point. FIG. 6B shows an environment 622 where user's hand 616 slides selected representation 618 toward second physical object 612, as indicated by an arrow 624, in order to reassociate selected representation 618 with second physical object 612.

In a preferred embodiment of the present invention, user's hand 616 need not drag selected representation 618 precisely to a reassociation point at or under second physical object 612. According to embodiments of the present invention, as will be further described below, once user's hand 616 directs selected representation close to second physical object 612, the proximity of the selected representation to the second physical object is sufficient to indicate that the user wishes to reassociate selected representation 618 with second physical object.

Figure 6C:
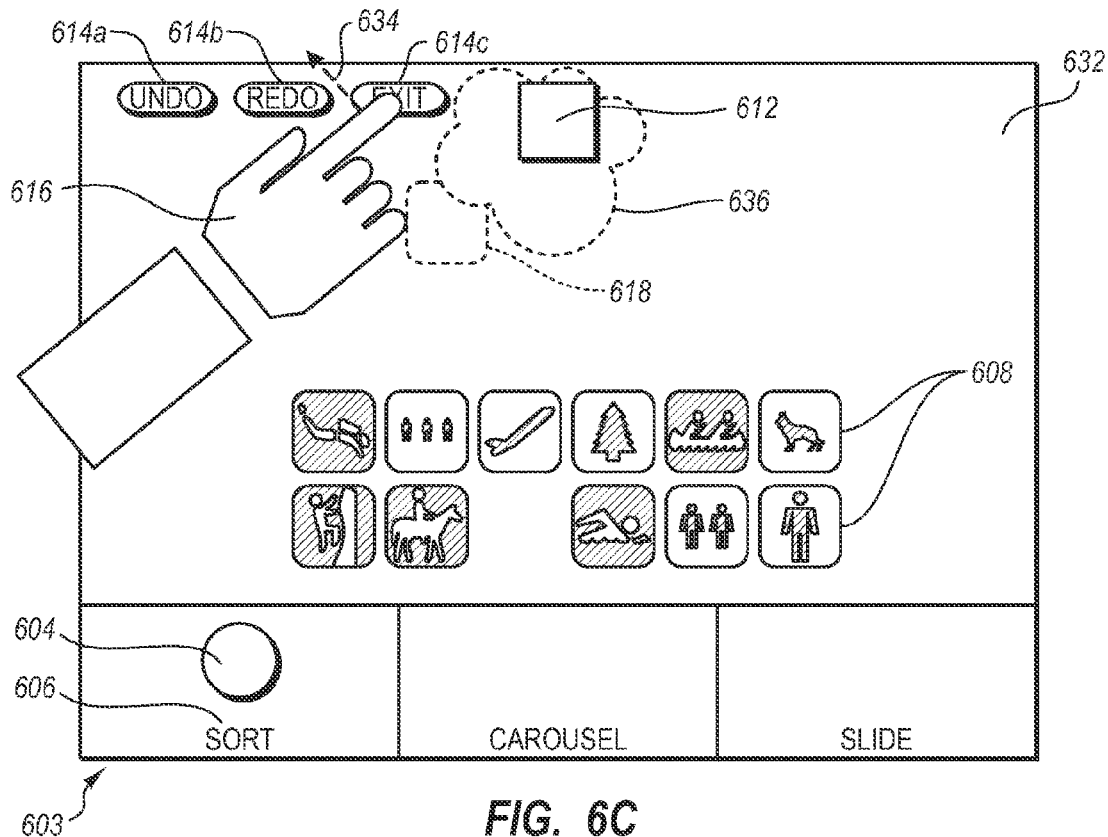

Thus, as shown in FIG. 6C, in environment 632, user's hand 616 has moved selected representation 618 sufficiently close to second physical object 612 to cause selected representation 618 to become reassociated with second physical object 612. As shown in environment 632 and, more particularly, by an arrow 634, user's hand 616 has dragged selected representation 618 near second physical object 612, although not directly over second physical object 612. Embodiments of the present invention allow imperfect but unambiguous user movements to reassociate data elements.

Once selected representation 618 is brought sufficiently close to second physical object 612 to effect reassociation with second physical object 612, interface display surface 603 presents visual confirmation of the reassociation of selected representation 618. In environment 632 of FIG. 6C, a reassociation animation in the form of a disappearance of selected representation 618 and a puff-of-smoke type animation 636 near the reassociation point visually confirm reassociation of the data element depicted by selected representation 618. Similar animations may be associated with presentations of representations from physical objects with which they are associated to highlight, confirm, or dramatize the clarification of origin of the representations.

Figure 6D:
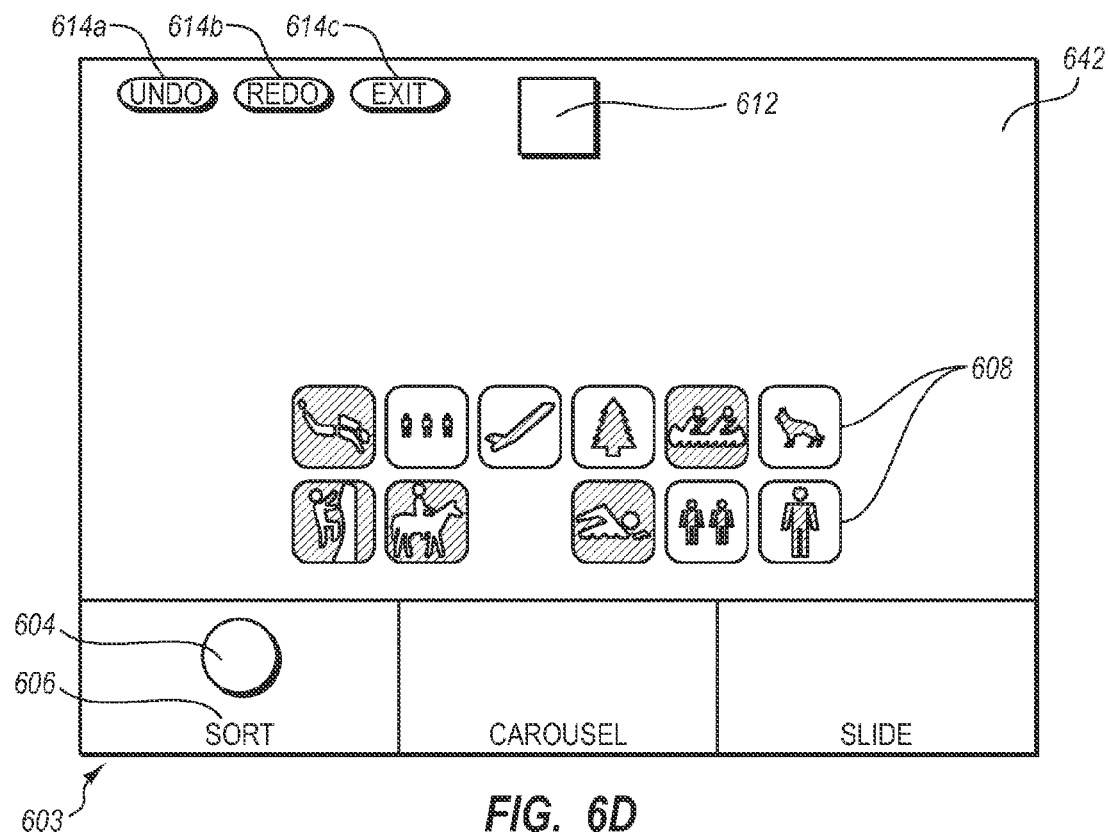

In FIG. 6D, a sort mode environment 642 is shown after selected representation 618 has been reassociated with second physical object 612. As illustrated in this Figure, where selected representation 618 once was part of representations 608 associated with physical object 604, after selected representation 618 has been reassociated with second physical object 612, it is no longer associated with physical object 604. Thus, selected representation 618—and the data element selected representation 618 depicts—are removed from representations 608 associated with physical object 604.

Data elements can be copied just as they can be moved. In other words, instead of disassociating the data element depicted by selected representation 618 from physical object 604, the data element depicted can both be reassociated with second physical object 612 and remain associated with physical object 604. Just as data elements can be copied from one folder or disk to another on a personal computer instead of being moved from one to the other, embodiments of the present invention are configurable to carryout the copying function. To facilitate such choices, an additional control icon (not shown) may be presented on interactive display surface 603 where a user, by making a gesture, can toggle between move and copy modes, or where a user can designate whether each reassociation between physical objects should be performed as a move or a copy, etc.

Visually Confirming—Reassociation of a Data Element

In visually confirming reassociation of a data element by copying or moving, a reassociation animation may be applied to the representation of the reassociated data element. FIGS. 7A-7F show a plurality of reassociation animations that may be used. The reassociation animations may be selectively applied to correspond with certain types of user movements, as is described below.

Figure 7A:
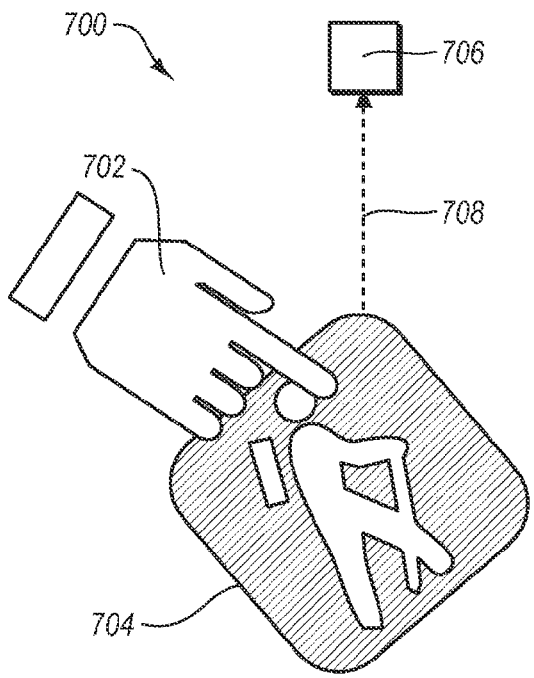
Figure 7A:
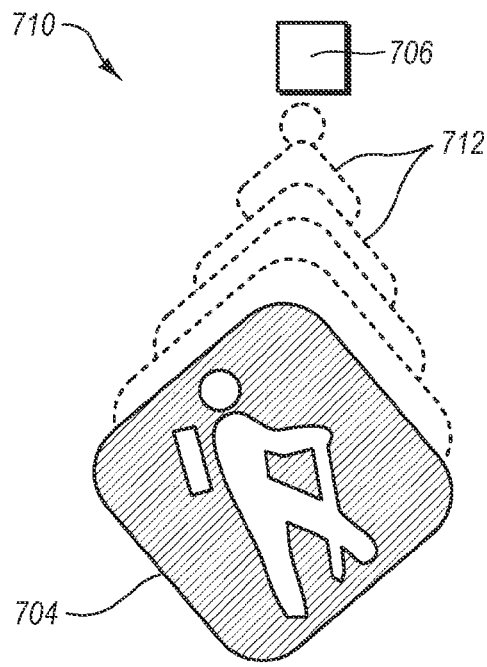

In FIG. 7A, an example 700 shows a user's hand 702 dragging a selected representation 704 toward a physical object 706 for reassociation. As shown by an arrow 708, user's hand 702 drags selected representation 704 directly to physical object 706. Once selected representation 704 reaches physical object 706 and is released by user's hand 702, an appropriate reassociation animation to visually confirm reassociation of selected representation 704 with physical object 706 is presented. As shown in FIG. 6C, a puff-of-smoke, disappearance type animation 636 may be used to visually confirm the reanimation. Alternatively, as shown in an example 710 of FIG. 7B, a shrinking-type animation may be used. As shown in this example, the shrinking-type animation might show selected representation 704 diminishing in size and disappearing into a side of the reassociation point presented by second physical object 706, as shown by dotted lines 712. Alternatively, selected representation 704 might shrink in place, directly around physical object 706.

Figure 7C:
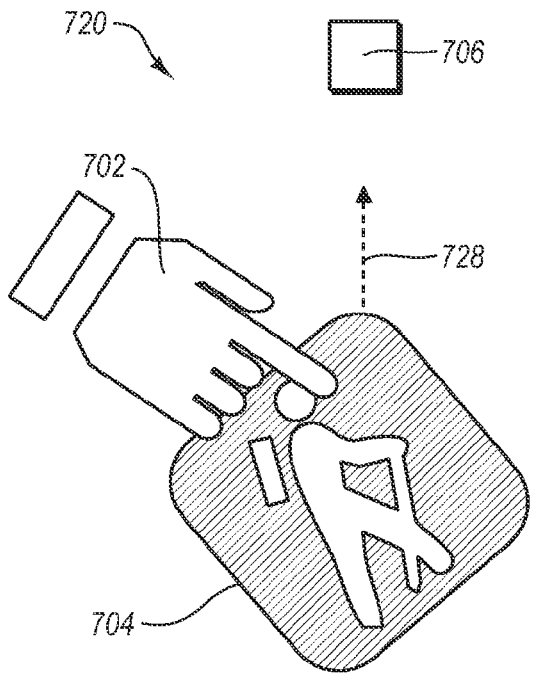

In FIG. 7C, an example 720 shows user's hand 702 pushing or flicking selected representation 704 directly toward physical object 706 for reassociation. As shown by an arrow 728, user's hand 702 does not drag selected representation 704 all the way to physical object 706. Instead, user's hand 702 pushes selected representation 704 directly toward physical object 706, as one might slide a shuffleboard puck toward a target, by giving the puck a push then releasing it. Embodiments of the present invention are configured to recognize the movement of selected representation 704 toward physical object 706 and to apply the laws of momentum in maintaining the motion of the selected representation, to assist the user in achieving a desired result.

Figure 7D:
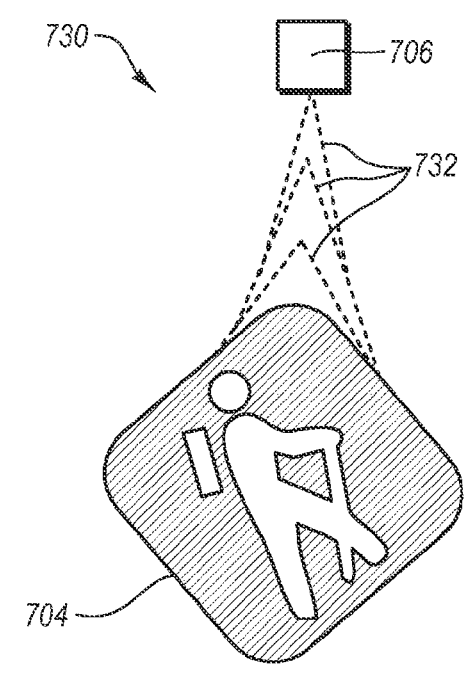

As shown in example 730 of FIG. 7D, once selected representation 704 is within a threshold range of physical object 706, the reassociation animation presented depicts the reassociation point represented by physical object 706 pulling or sucking selected representation 704 into physical object 706. The reassociation animation depicted by dotted; lines 732 shows selected representation 704 being stretched or distorted and pulled into physical object 706 as though by gravitational tidal forces.

Figure 7E:
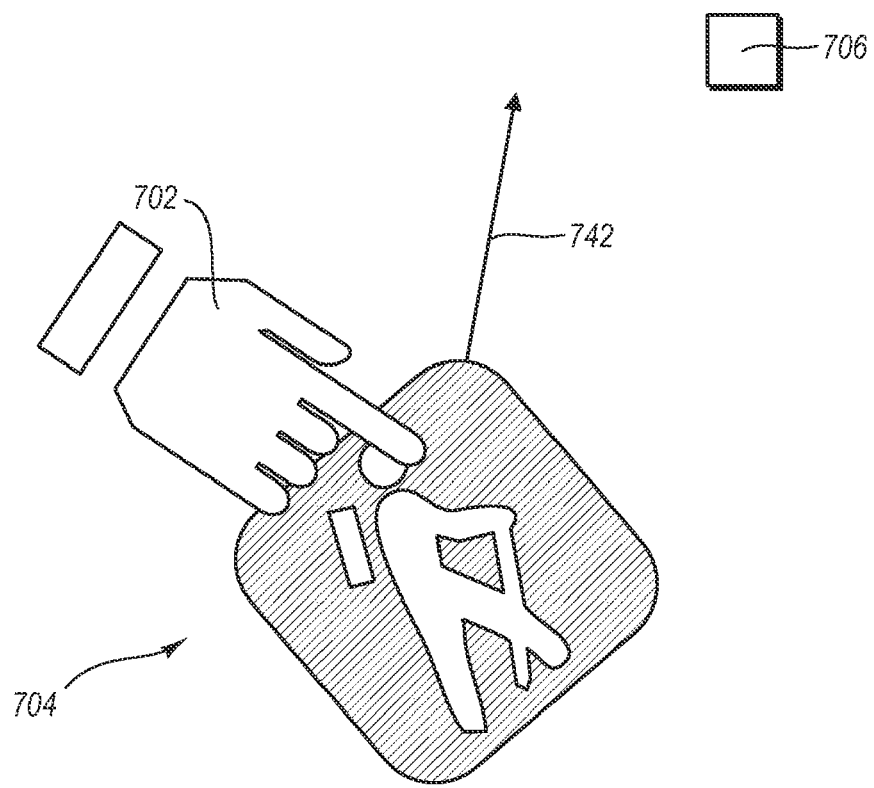

In FIG. 7E, an example 740 shows user's hand 702 pushing or flicking selected representation 704 generally toward physical object 706 for reassociation. However, in contrast with the pushing of selected representation 704 in example 720 of FIG. 7C, in this case, user's hand 702 does not push selected representation 704 directly on-line with physical object 706 as shown by a line 742.

Figure 7F:
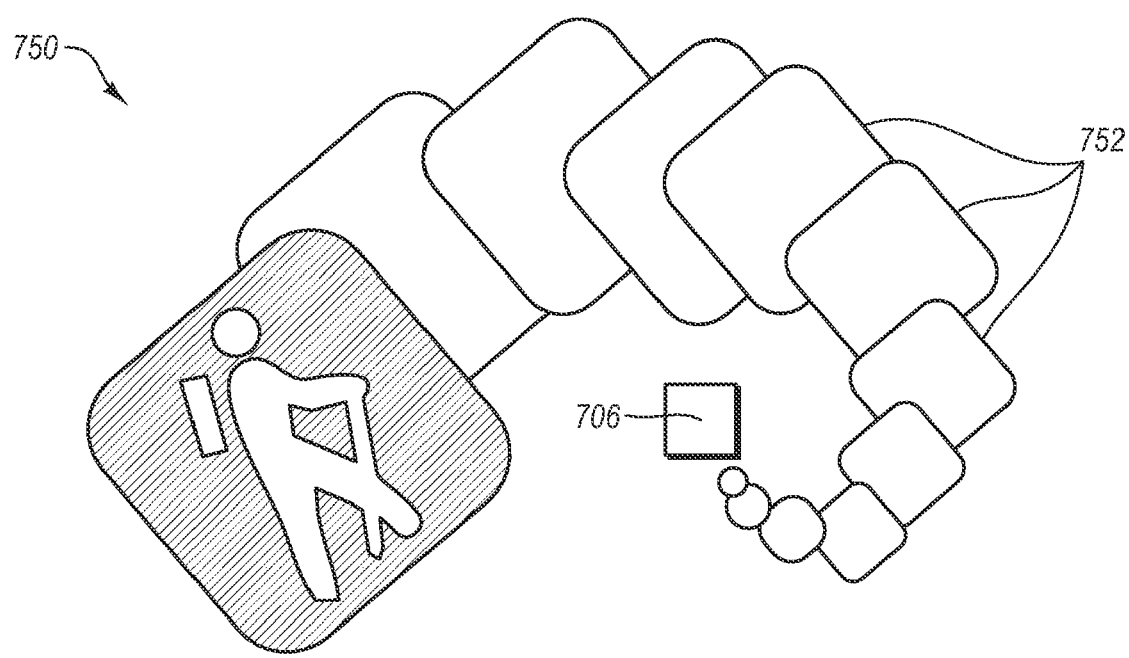

As shown in an example 750 of FIG. 7F, once selected representation 704 is within a threshold range of physical object 706, the reassociation animation presented depicts selected representation 704 spiraling into physical object 706, as though being pulled down a drain, or falling into physical object 706 as though in a decaying orbit about a body exerting a gravitational pull, as shown by shrinking dotted outlines 752 of selected representation 704. Example 750 shows selected representation 704 shrinking as it spirals into the reassociation point of physical object 706, but such a reassociation animation is not limited to this form of animation. Instead, selected representation 704 could spiral around physical object 706 at its full size, selected representation 704 might spin about its center as it spirals toward physical object 706, or the reassociation of selected representation 704 might be animated in another form. Also, although example 750 shows selected representation spiraling into physical object 706 after less than one revolution, selected representation 704 might spiral into physical object 706 after one or more revolutions determined randomly or by using a gravitational equation to determine how an orbit of selected representation 704 might realistically decay into an object exerting a nominal gravitational pull on selected representation 704.

It should be noted that embodiments of the present invention are not limited to having reassociation animations correlated with the type of movements of selected representation 704 toward physical object 706, as previously described in connection with FIGS. 7A-7F. For example, the pulling, distorting animation of example 730 may be used when selected representation 704 is dragged directly to physical object 706 or when selected representation 704 is gestured generally toward but not directly on line toward physical object 706. As a further alternative, other reassociation animations may be applied, including a single reassociation animation applied for all types of movements, different reassociation animations randomly applied to different types of movements, or other permutations.

Access of Data Elements Using a Physical Object at Another Location

In reassociating data elements with physical objects, data elements are accessible via the same interactive display surface where the reassociation occurred. Furthermore, if the interactive display surface where the reassociation was conducted is in communication with a server via a network or a direct communication line, the reassociated data elements also may be accessible via another interactive display surface that is in communication with the server. Thus, by transporting the physical object with which data elements have been reassociated to a different interactive display surface, the reassociated data elements can be accessed from that different interactive display surface.

Figure 8A:
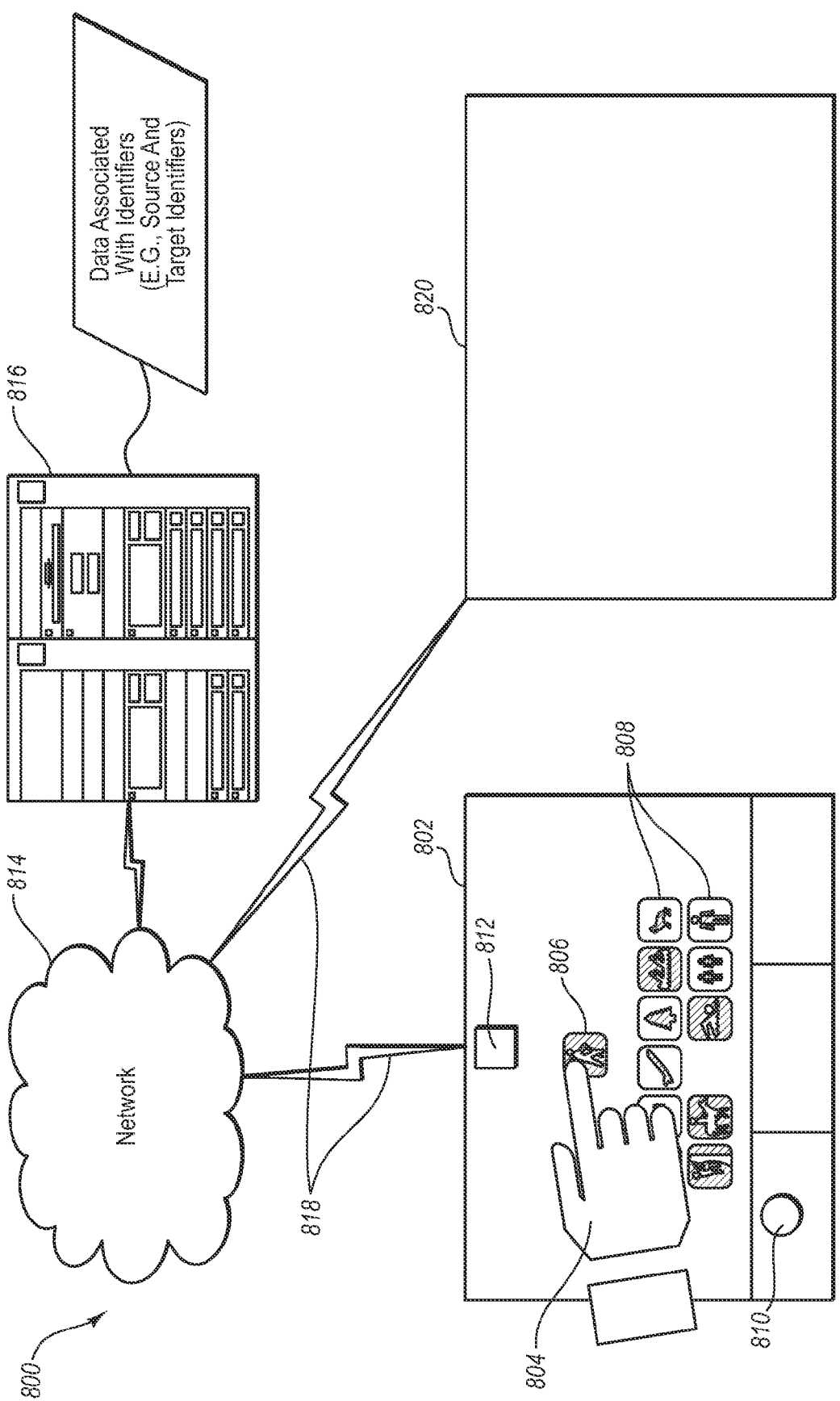
FIGS. 8A-8B illustrate a pair of interactive display surfaces in communication with a networked server to enable data elements associated with a physical object at a first interactive display surface to be retrieved at a second interactive display surface using the same physical object.

A system 800 in FIG. 8A includes a first interactive display surface 802 where a user's hand 804 is shown reassociating a selected data element, as previously described. The selected data element is depicted by a selected representation 806. Selected representation 806 is indicated by user's hand 804 from among a plurality of representations 808 formerly associated with a first physical object 810. User's hand 804 moves selected representation 806 to reassociate it with a second physical object 812. As previously described, the reassociation may indicate the data element represented by selected representation 806 is being moved or copied in being reassociated with second physical object 812.

Reassociation of the selected data element depicted by selected representation 806 is recorded by local storage associated with interactive display surface 802 and/or stored or registered on a network 814. Network 814 uses one or more servers 816 to store information for retrieval across the network. Interactive display surface 802 is in communication with network 814 over a communication medium 818. Network 814 may include a local area network or a wide area network, such as the Internet. Communication medium 818 may include switched or dedicated wired communications lines or wireless communication facilities. Network 814 also is in communication with a second interactive display surface 820, as will be explained below.

Figure 8B:
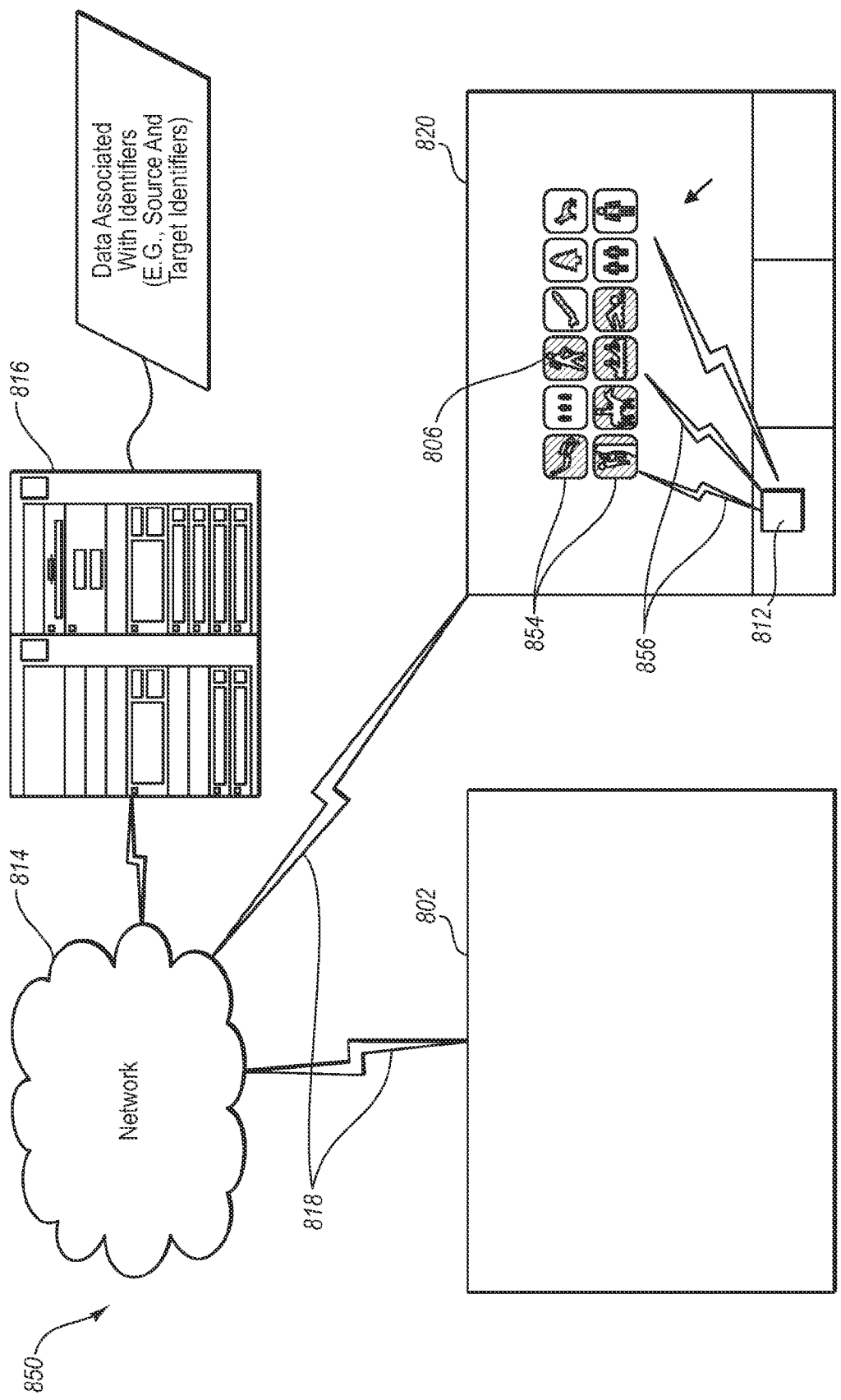

In a system 850, which is illustrated in FIG. 8B, second interactive display surface 820 is receiving second physical object 812 after data elements have been reassociated with second physical object 812, as shown in FIG. 8A. Once second physical object 812~is disposed adjacent to second interactive display surface 820, data elements associated with second physical object 812 are accessed. As previously described, a characteristic or identification associated with second physical object 812 is read, and data elements associated therewith are retrieved. If association information or data elements associated with second physical object 812 are not available in local storage coupled with second interactive display surface 820, either at user direction or automatically, second interactive display surface 820 communicates with network 814 over communication medium 818, and data elements associated with second physical object 812 are retrieved from server 816.

As a result, representations of data elements 854 are presented on second interactive display surface 820. Analogous to reassociation animations previously described in connection with FIGS. 6C and 7A-7F, one or more animations depicted by lines 856 may highlight presentation of representations 854. It should be noted that selected representation 806, reassociated with second physical object 812 in FIG. 8A, is included among representations 854 accessible on second interactive display surface 820 via network 814, as well as the associations with second physical object 812 previously made.

Flowchart for Presentation of Data Elements Associated with a Physical Object

Figure 9:
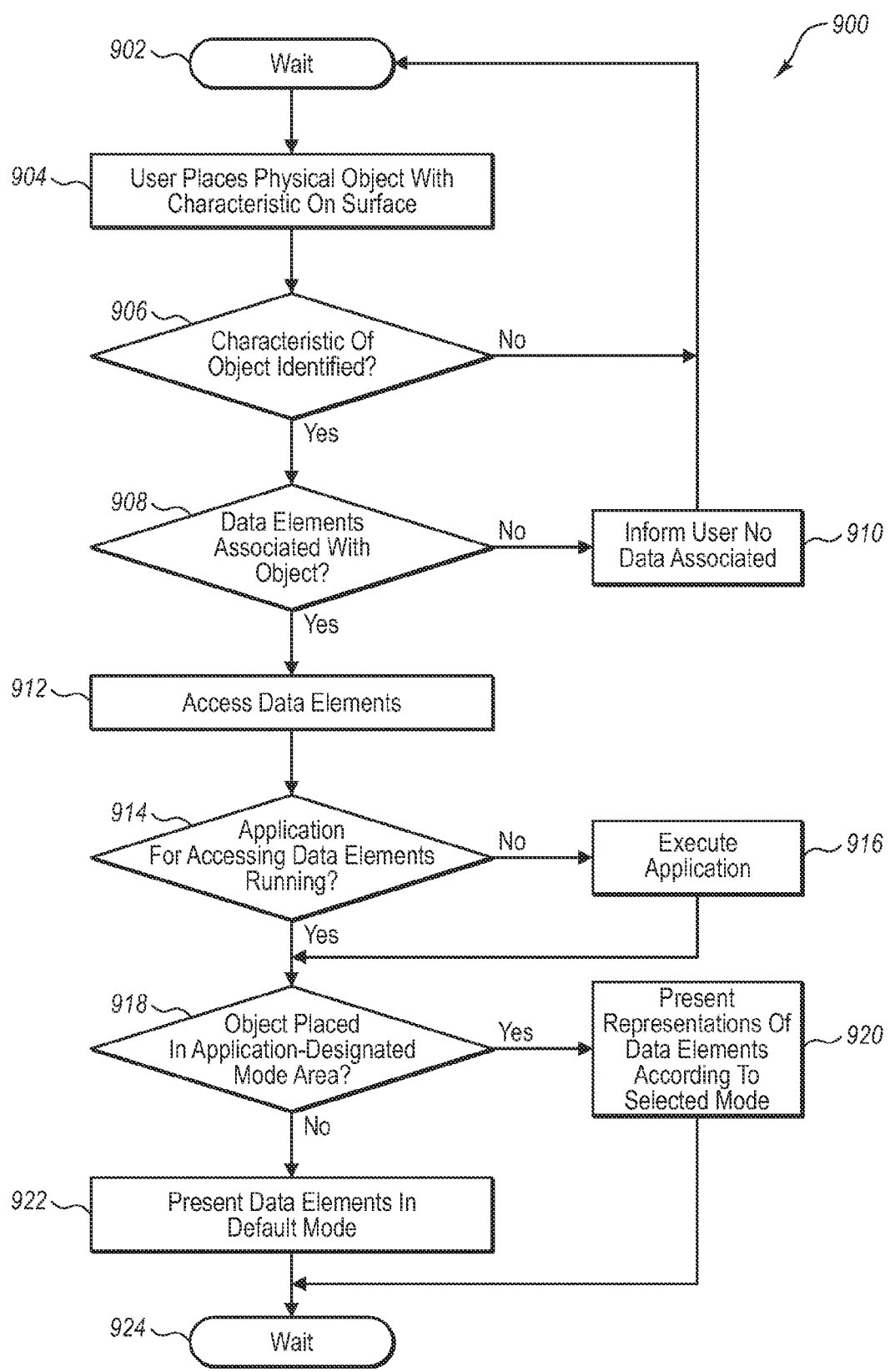
FIG. 9 is a flow diagram illustrating the logical steps for presenting data elements associated with a physical object.

FIG. 9 is a flow diagram of a flowchart 900 illustrating the logical steps for presenting data elements associated with a physical object. Flowchart 900 commences at a step 902, where the interactive display surface waits for user input to commence execution of a program. At a step 904, a user places a physical object on the interactive display surface. The physical object presents a characteristic, such as a shape or an IR reflective identification pattern that can be identified by the interactive display surface, as previously described. At a decision step 906, it is determined if the characteristic presented by the physical object is identifiable. If not, flowchart 900 loops to step 902 for a physical object presenting an identifiable characteristic to be placed adjacent the interactive display surface. Alternatively, the user may be informed that the physical object presents no identifiable characteristic. As a further alternative, the user may be presented with an opportunity to register the characteristic presented by the physical object with the interactive display surface so that data elements may be associated with the physical object.

If the characteristic presented by the physical object is identified at decision step 906, at a decision step 908, it is determined if data elements are associated with the characteristic presented by the physical object. If not, at a step 910, the user is informed that no data elements are presently associated with the characteristic presented by the physical object, and flowchart 900 loops to step 902 to await placement of a physical object presenting an identifiable characteristic.

If, on the other hand, at decision step 908 it is determined that data elements are associated with the characteristic presented by the physical object, at a step 912 the data elements associated with the characteristic presented by the physical object are accessed. At a decision step 914, it is determined if an application operable to access the associated data elements is executing on the interactive display surface. If not, at a step 916, an application operable to access the associated data elements is executed. Once the application is launched at step 916 or if an application operable to access the associated data elements is already executing on the interactive display surface, at a decision step 918, it is determined if the physical object was placed in an application-designated mode area. Such mode areas previously were described in connection with FIGS. 4A-4C, where placement of the physical object determined if representations of data elements were presented in sort, carousel, or slideshow modes.

If it is determined at decision step 918 that the object is placed in an application-designated mode area, at a step 920, representations of the data elements are presented according to the selected mode. On the other hand, if it is determined at decision step 918 that the object was not placed in an application-designated mode area (or if the application does not recognize application-designated mode areas), at a step 922, representations of the data elements are presented according to a default mode. It will be appreciated that an application for presenting the data element representations could query the users regarding the mode desired, or the types of data representations ranging from names, to icons, to full or partial content of the data elements—that the user wishes to view. Once the representations of the data elements are presented on the interactive display surface, flowchart 900 reaches a step 924, where the application awaits a user's next action with regard to the representations of the data elements or the physical object.

Flowchart for Reassociation of a Data Element with a Physical Object

Figure 10:
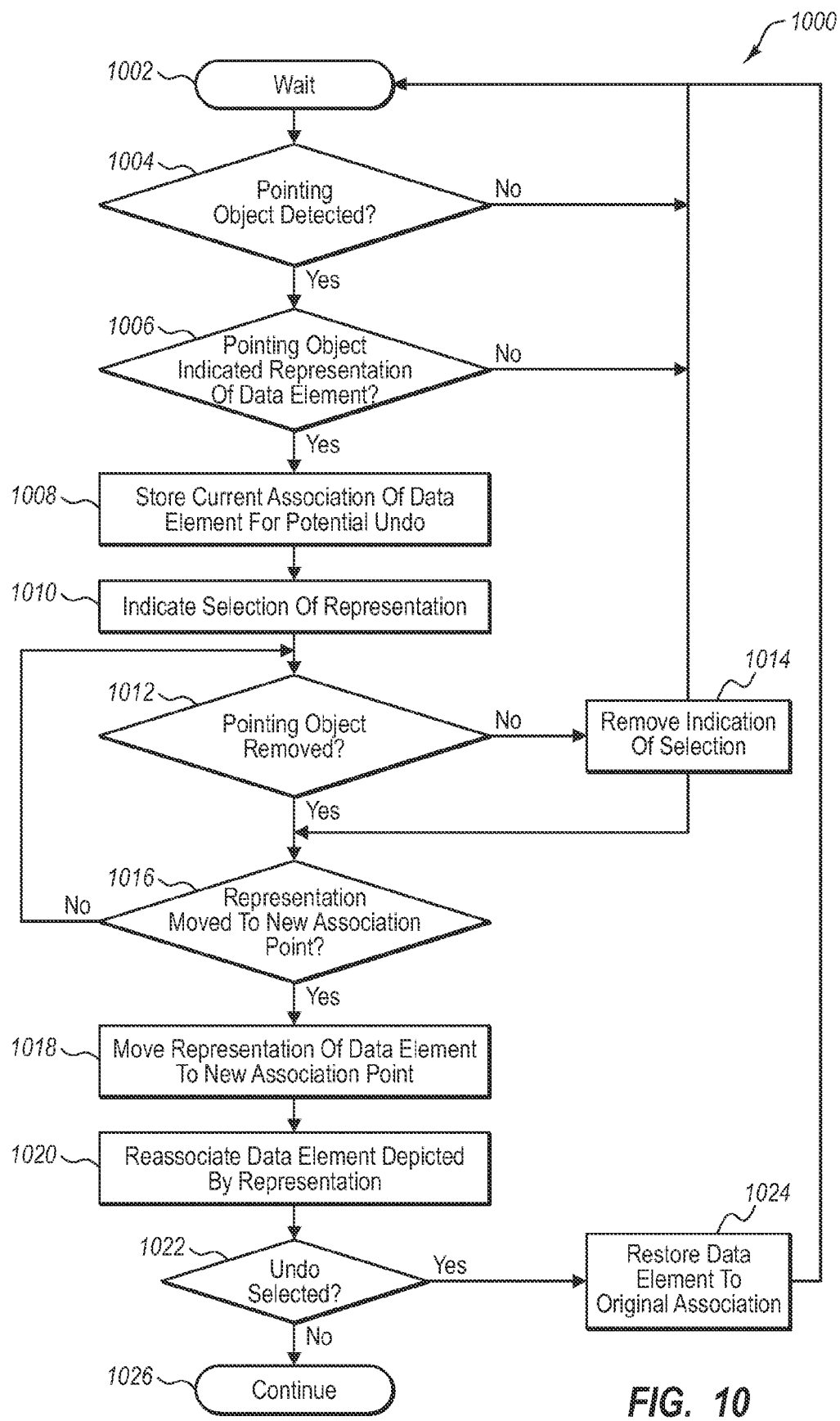
FIG. 10 is a flow diagram illustrating the logical steps for facilitating reassociation of data elements associated with a physical object.

FIG. 10 is a flowchart 1000 illustrating the logical steps for facilitating reassociation of data elements associated with a physical object. Flowchart 1000 commences at a step 1002 like that of step 924 in flowchart 900 (FIG. 9), where the interactive display surface waits for user input regarding the representations of the data elements or the physical object presented on the interactive display surface. At a decision step 1004, it is determined if a pointing object is detected. The pointing object may include the user's hand or finger, or another physical object, possibly including an object presenting a characteristic or identification signifying its purpose to the interactive display surface as a pointing object.

Examples of a method and system for detecting and responding to a pointing object or other objects placed on or near a graphical surface have been disclosed in applications for other inventions owned by the assignee of the present application. Embodiments of these inventions are described in co-pending U.S. patent applications, including application Ser. No. 10/813,855 entitled "Template Matching On Interactive Surface," application Ser. No. 10/814,577 entitled "Identification Of Object On Interactive Display Surface By Identifying Coded Pattern," and application Ser. No. 10/814, 761 entitled "Determining Connectedness and Offset Of 3D Objects Relative to an Interactive Surface," all of which were filed on Mar. 31, 2004.

If it is determined at decision step 1004 that no pointing object is detected, flowchart 1000 loops to step 1002 to await presentation of a pointing object or another command. On the other hand, if a pointing object is detected at decision step 1004, at a decision step 1006, it is determined if the pointing object has indicated a representation of a data element. That the pointing object has indicated a representation may be determined by whether the pointing object is detected touching the interactive display surface within the boundaries of a representation, the pointing device has approached within a predetermined threshold distance of a representation on the interactive display surface, the pointing device hovers within a threshold distance of the representation on the interactive display surface, or by another defined indication.

If it is determined at decision step 1006 that a pointing object has indicated a selected representation, at a step 1008, a current association of the data element depicted by the representation is stored in a list for a possible "undo" operation. At a step 1010, an indication that the representation has been selected is made. For example, a bright outline may be presented around the selected representation, a brightness of the selected representation could be increased, the selected representation may blink, or a similar indication that the representation has been chosen is provided.

At a decision step 1012, it is determined if the pointing object has been removed or remains in the selecting position with regard to the chosen representation. If it is determined at decision step 1012 that the pointing object has been removed from the interactive display surface, at a step 1014, the indication of the selection of the representation, such as the highlighted border or other indication, is removed. Flowchart 1000 then loops to step 1002 to await a user action. On the other hand, if it is determined at decision step 1012 that the pointing object has not been removed, at a decision step 1016, it is determined if the pointing object has moved to a new association point. The new association point may include a new position in an order of data elements, as described in connection with FIGS. 5A and 5B, or an affiliation with a new physical object, as described in connection with FIGS. 6A-6D. If it is determined at decision step 1016 that the representation has been moved to a new association point, at a step 1018, the representation of the data element is moved to the new association point presented on the interactive display surface. Then, at a step 1020, the data element depicted by the representation is reassociated with other data elements associated with the same physical object to reflect a changed sequence or positioning of data elements, or the data element is reassociated with a new physical object.

At a decision step 1022, it is determined if an undo command has been indicated. An undo command may be indicated by the user touching the interactive display surface at an indicated position, as described in connection with FIGS. 5A-5B, or in another defined way. If it is determined at decision step 1022 that an undo command has been indicated, at a step 1024, the data element is restored to its original association by referencing the association stored at step 1008. On the other hand, if it is determined at decision step 1022 that no undo command has been indicated, flowchart 1000 proceeds to a step 1026, where the program awaits a next action from a user to reassociate a data element, to terminate the application, or to take some another action.

Figure 11:
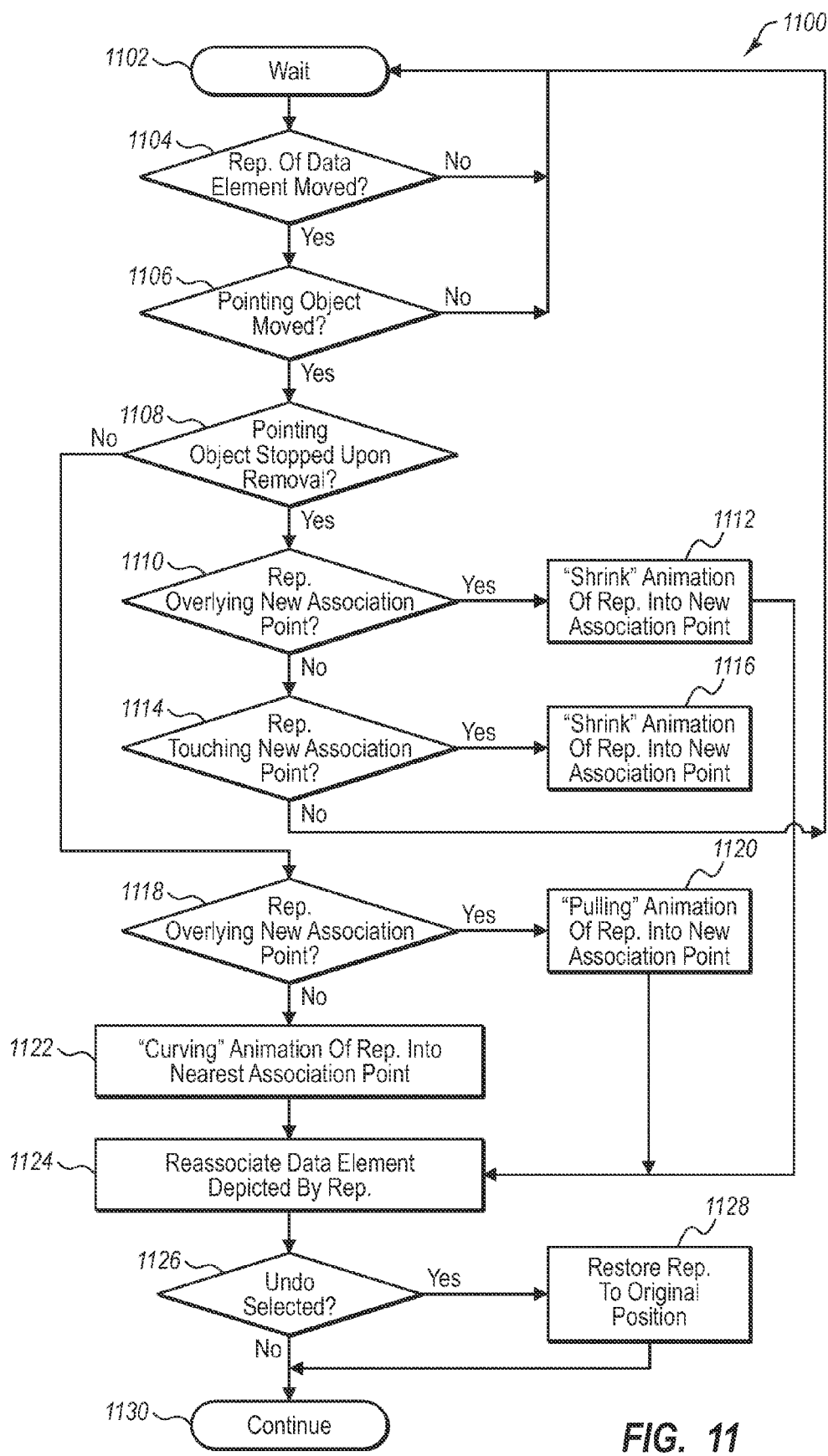
FIG. 11 is a flow diagram illustrating the logical steps for presenting reassociation animations of data elements.

Flowchart for Reassociation Animations Confirming Reassociation of a Data Element FIG. 11 illustrates the logical steps of a flowchart 1100 for presenting reassociation animations to signal or confirm reassociation of data elements. Flowchart 1100 embodies a function of an embodiment of the present invention in which the reassociating of representations of data elements is highlighted to both confirm the reassociation of data elements and to entertain the user. Flowchart 1100 may operate in cooperation with flowchart 1000 to highlight reassociation of data elements.

Flowchart 1100 begins with a step 1102. During step 1102, the interactive display surface awaits a user action. At a decision step 1104, it is determined if a representation of a data element has been moved to signify potential reassociation of a data element. If it is determined at decision step 1104 that no representation has been moved, flowchart 1100 loops to step 1102 to await user action. On the other hand, if it is determined at decision step 1104 that a representation has been moved, at a decision step 1106, it is determined if the pointing object has been removed from the interactive display surface. As previously described in regard to decision step 1012 of flowchart 1000 (FIG. 10), if the pointing object has been removed before a reassociation has been made, the data element depicted by the representation remains in its current association. On the other hand, if it is determined at decision step 1106 that the pointing object has not been removed, at a decision step 1108, it is determined if the pointing object was stopped upon being removed from the interactive display surface. As described in connection with FIGS. 7C-7F, embodiments of the invention provide for reassociation of a data element by a user sliding the representation depicting the data element toward a reassociation point without actually dragging the representation completely to the reassociation point.

If it is determined at decision step 1108 that the pointing object was stopped upon being removed from the interactive display surface, at a decision step 1110, it is determined if the representation is overlying a new association point, such as a new position in an order of data elements or a new position corresponding with a new physical object. If it is determined at decision step 1110 that the representation is overlying a new association point, at a step 1112, a reassociation animation such as the "shrink" animation of FIG. 7B is applied. On the other hand, if it is determined at decision step 1110 that the representation is not overlying the new association point, at a decision step 1114, it is determined if the representation is touching or otherwise adjacent a new association point within an established threshold distance. If it is determined that the representation is touching or otherwise adjacent the new association point, at a step 1116, a reassociation animation such as the "disappear" animation of FIG. 6C is applied. In one embodiment of the present invention, particular reassociation animations are correlated with particular types of reassociation, but the correlated animations are not limited to the correlations shown in FIGS. 6B, 7A-7F, or flowchart 1100. On the other hand, if it is determined at decision step 1114 that the representation is not touching or adjacent the new association point, because it already has been determined at decision step 1108 that the representation was not moving and at decision step 110 that the representation was not overlying the new association point, it is assumed the representation has not been reassociated. Thus, flowchart 1100 returns to step 1102 to wait for a user to await user action If it is determined at decision step 1108 that the pointing object was not stopped upon removal, flowchart 1100 proceeds to a decision step 1118 to determine if, as the pointing object was removed from adjacent the interactive display surface, the representation was being moved on a line toward a new association point. If it is determined that the representation was moving on a line toward a new association point, at a step 1120, a "pulling" animation of FIG. 7D is applied. On the other hand, if it is determined at decision step 1118 that the representation was not moving on a line toward a new association point when the pointing object was removed, at a step 1122, a curving, spiraling animation of FIG. 7F is applied to show the representation being drawn into the nearest reanimation point. The nearest reassociation point may be the original association point with which the representation originally was associated. Accordingly, the representation may curve or spiral back into that original association point, such as the representation's original place in the sort mode or the carousel mode.

Also, although not shown in flowchart 1100, an additional decision step may be used to determine that the representation has been removed a determined threshold distance from its original association point as a threshold limit to determine if the user meant to reassociate the data element depicted by the representation. If the representation is not moved by at least this threshold distance, the representation may snap back to its original position to confirm the data element has not been reassociated. Once the reassociation animation has been presented to visually confirm reassociation of the representation depicting the data element—even if the representation is reassociated with its original association point—at a step 1124, the data element depicted by the representation is reassociated.

At a decision step 1126, it is determined if an undo command has been indicated. An undo command may be indicated by touching the interactive display surface at an indicated position, as described in connection with FIGS. 5A-5B, or in another indicated way. If it is determined at decision step 1022 that an undo command has been indicated, at a step 1128 the data element is restored to its original association. On the other hand, if it is determined at decision step 1126 that no undo command has been indicated, flowchart 1100 proceeds to a step 1130 where the program awaits a next action from a user to reassociate a data element, to terminate the application, or to take some other action.

Flowchart for Storage of Reassociated Data Elements

Figure 12:
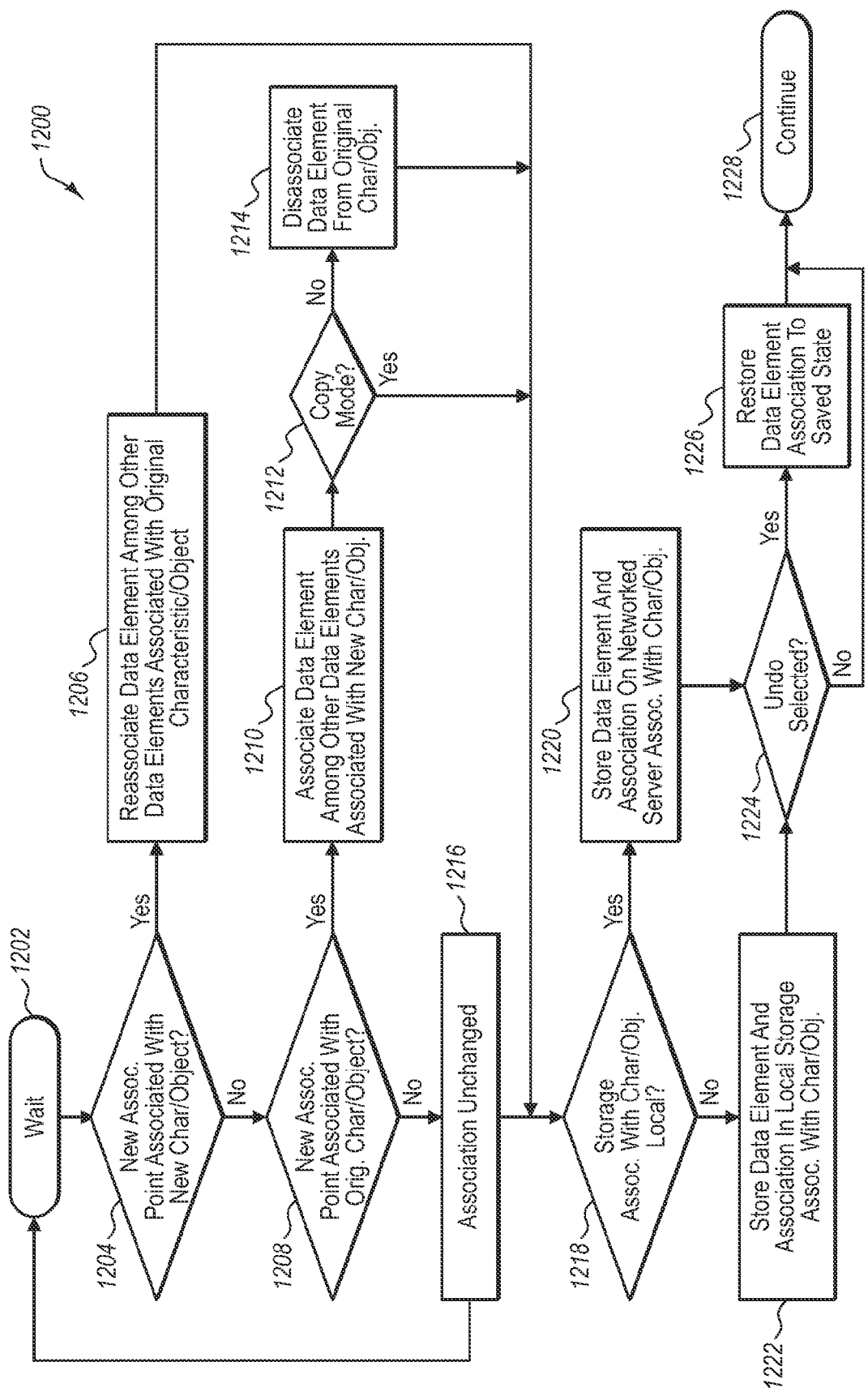
FIG. 12 is a flow diagram illustrating the logical steps for storing data elements associated with a physical object.

FIG. 12 is a flowchart 1200 for storing data elements associated with a physical object. As described in flowchart 1100 (FIG. 11), once a visual indication of reassociation of the representation depicting the data element has been performed, the data element depicted is reassociated. As described in connection with FIGS. 8A-8B, reassociation of the data element may involve reassociation in local storage and/or on a server accessible via a network, as is further described by flowchart 1200.

Flowchart 1200 begins at a step 1202 where the program awaits an indication that a user has reassociated a representation depicting a data element. At a decision step 1204, it is determined if a new association point for representation a data element is associated with a characteristic presented by a physical object with which the data element originally was associated. If it is determined at decision step 1204 that the new association point is related to the characteristic presented by the physical object with which the data element originally was associated, at a step 1206, the data element is reassociated with the characteristic presented by the physical object with which the data element originally was associated. The data element is associated in a new relationship among other data elements associated with the characteristic presented by the physical object.

On the other hand, at decision step 1204, if it is determined that the data element is not being associated with a characteristic presented by a physical object with which the data element originally was associated, flowchart 1200 proceeds to a decision step 1208. At decision step 1208, it is determined if the new association point is related to a characteristic presented by a new physical object. If it is determined at decision step 1208 that the data element is associated with a characteristic presented by a new or different physical object, at a step 1210, the data element is associated with the characteristic presented by the new physical object. At a decision step 1212 it is determined if the system is in a copy mode. In a copy mode, the data element is reassociated with the characteristic presented by the new physical object, but its existing association is not changed. On the other hand, in a move mode, the data element's association will be eliminated once it is reassociated with a characteristic presented by a new physical object. Thus, if it is determined at step 1212 that the system is not in a copy mode, at a step 1214, the data element is disassociated from the characteristic presented by the original object and flowchart 1200 proceeds to a decision step 1218. However, if the system is determined at decision step 1212 to be in a copy mode, flowchart 1200 proceeds directly to decision step 1218.

If it is determined at decision step 1204 that the data element is not associated with a new association point associated with a same physical object and it is determined at decision step 1208 that the data element is not associated with a new association point associated with new physical object, then the data element is not being reassociated. Accordingly, at a step 1216, the association of the data element is left unchanged. Flowchart 1200 loops to step 1202 for a user action to change an association of a data element.

On the other hand, once the data element has been reassociated with its new association point, the data element's reassociation will be stored. Thus, at a decision step 1218, it is determined if the characteristic presented by the physical object is associated with local storage. If it is determined that the characteristic is not associated with local storage, at a step 1220, the data element and its association with the characteristic presented by the physical object is stored in a networked storage coupled with the interface display surface (or PC 20). On the other hand, if it is determined that the characteristic is associated with local storage, at a step 1222, the data element and its association with the characteristic presented by the physical object is stored in local storage. As previously described in connection with FIGS. 8A-8B, if data elements and their association with a physical object are stored on a networked server, the data elements can be accessed by using the physical object with a different interactive display surface.

At a decision step 1224, it is determined if an undo command has been indicated. An undo command may be indicated by touching the interactive display surface at an indicated position, as described in connection with FIGS. 5A-5B, or in another defined way. If it is determined at decision step 1224 that an undo command has been indicated, at a step 1226 the data element is restored to its original association. On the other hand, if it is determined at decision step 1224 that no undo command has been indicated, flowchart 1200 proceeds to a step 1228 where the program awaits a next action from a user to reassociate a data element, to terminate the application, or to take another action.

Although the present invention has been described in connection with the preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A method for reassociating data elements associated with a physical object placed adjacent to an interactive display surface connected to a computing device, the method comprising:
   (a) storing computer readable machine instructions on a computer readable media that when executed by a processor cause reading a characteristic presented by the physical object when the physical object is disposed adjacent to the interactive display surface to be performed;
   (b) storing computer readable machine instructions on a computer readable media that when executed by a processor cause accessing the data elements associated with the characteristic from data storage to be performed;
   (c) storing computer readable machine instructions on a computer readable media that when executed by a processor cause showing on the interactive display surface a representation depicting each of the data elements to be performed;
   (d) storing computer readable machine instructions on a computer readable media that when executed by a processor cause detecting adjacent to the interactive display surface a user movement indicating a user command to reassociate a selected representation of a data element to be performed;
   (e) storing computer readable machine instructions on a computer readable media that when executed by a processor cause reassociating the data element corresponding to the selected representation to be performed; and
   (f) storing computer readable machine instructions on a computer readable media that when executed by a processor cause visually confirming reassociation of the data element by showing the selected representation being reassociated on the interactive display surface to be performed.

2. The method of claim 1, wherein the characteristic includes a light reflective identification disposed on a surface of the physical object.

3. The method of claim 1, wherein the representation of each of the data elements includes one of:
   (a) a content of the data element;
   (b) a portion of the content of the data element;
   (c) a name representing the data element; and
   (d) an icon representing the data element.

4. The method of claim 3, wherein a manner of presenting the representation is determined by a location where the physical object is placed on the interactive display surface.

5. The method of claim 1, wherein the user movement includes one of:
   (a) a hand gesture;
   (b) a movement of a pointing object presenting a pointing identifier; and
   (c) a movement of the physical object.

6. The method of claim 1, wherein the computer readable machine instructions on a computer readable media that when executed by a processor cause reassociating the data element corresponding to the selected representation includes computer readable machine instructions on a computer readable media that when executed by a processor cause resequencing the data elements associated with the characteristic to be performed.

7. The method of claim 1, wherein computer readable machine instructions on a computer readable media that when executed by a processor cause showing the selected representation being reassociated on the interactive display surface includes computer readable machine instructions on a computer readable media that when executed by a processor cause presenting a reassociation animation between the selected representation and a reassociation point, said reassociation animation including one of:
   (a) the reassociation point pulling the selected representation into the reassociation point;
   (b) the selected representation vanishing into the reassociation point;
   (c) the selected representation shrinking into the reassociation point; and
   (d) the selected representation curving into the reassociation point.

8. The method of claim 7, further comprising computer readable machine instructions on a computer readable media that when executed by a processor cause identifying a type of user movement; and determining the reassociation animation presented depending on the type of user movement that was identified to be performed.

9. The method of claim 1, further comprising computer readable machine instructions on a computer readable media that when executed by a processor cause performing an opening animation visually indicating the emergence of the representations from an entry point associated with the characteristic to be performed.

10. The method of claim 1; further comprising:
   (a) computer readable machine instructions on a computer readable media that when executed by a processor cause detecting when the characteristic is no longer adjacent to the interactive display surface to be performed; and
   (b) computer readable machine instructions on a computer readable media that when executed by a processor cause disabling a capability for reassociating the data elements associated with the characteristic to be performed.

11. A method for reassociating data elements associated with a first physical object placed adjacent to an interactive display surface connected to a computing device, the method comprising the steps of:
(a) storing computer readable machine instructions on a computer readable media that when executed by a processor cause reading a first characteristic presented by the first physical object when the first physical object is disposed adjacent to the interactive display surface to be performed;
(b) storing computer readable machine instructions on a computer readable media that when executed by a processor cause accessing the data elements associated with the first characteristic from data storage to be performed;
(c) storing computer readable machine instructions on a computer readable media that when executed by a processor cause showing on the interactive display surface a representation depicting each of the data elements to be performed;
(d) storing computer readable machine instructions on a computer readable media that when executed by a processor cause reading a second characteristic presented by a second physical object when the physical object is disposed adjacent to the interactive display surface to be performed;
(e) storing computer readable machine instructions on a computer readable media that when executed by a processor cause detecting adjacent to the interactive display surface a user movement indicating a user command to reassociate a selected representation with the second characteristic to be performed; and
(f) storing computer readable machine instructions on a computer readable media that when executed by a processor cause reassociating the data elements depicted by each selected representation with the second characteristic presented by the second physical object to be performed.

12. The method of claim 11, wherein at least one of the first characteristic presented by the first physical object and the second characteristic presented by the second physical object includes a light reflective identification.

13. The method of claim 11, wherein the user movement includes one of:
(a) a hand gesture;
(b) a movement of a pointing object presenting a pointing identifier; and
(c) a movement of the physical object.

14. The method of claim 11, wherein the computer readable machine instructions on a computer readable media that when executed by a processor cause reassociating the data element with the second characteristic includes one of:
(a) computer readable machine instructions on a computer readable media that when executed by a processor cause copying the data from a first storage location associated with the first characteristic to a second storage location associated with the second characteristic to be performed; and
(b) computer readable machine instructions on a computer readable media that when executed by a processor cause moving the data from the first storage location associated with the first characteristic to the second storage location associated with the second characteristic to be performed.

15. The method of claim 11, wherein the second characteristic is associated with one of:
(a) a local data storage associated with the computing device that is associated with the interactive display surface; and
(b) a remote data storage on a server accessible over a network, such that the data elements associated with the second identifier are accessed via one of:
(i) the interactive display surface; and
(ii) a second interactive display surface that is in communication with the remote data storage on the server.

16. The method of claim 11, further comprising storing computer readable machine instructions on a computer readable media that when executed by a processor cause visually confirming reassociation of the data element with the second characteristic by showing the selected representation being reassociated with the second characteristic presented by the second physical object on the interactive display surface to be performed.

17. The method of claim 16, wherein the computer readable machine instructions on a computer readable media that when executed by a processor cause showing the selected representation being reassociated with a reassociation point associated with the second characteristic presented by the second physical object on the interactive display surface to be performed includes computer readable machine instructions on a computer readable media that when executed by a processor cause carrying out one of the steps of:
(a) the reassociation point pulling the selected representation into the second characteristic presented by the second physical object;
(b) the selected representation vanishing into the reassociation point;
(c) the selected representation shrinking into the reassociation point; and
(d) the selected representation curving into the reassociation point.

18. The method of claim 17, further comprising storing computer readable machine instructions on a computer readable media that when executed by a processor cause identifying a type of user movement; and determining the reassociation animation presented depending on the type of user movement that was identified to be performed.

19. The method of claim 11, further comprising storing computer readable machine instructions on a computer readable media that when executed by a processor cause performing an opening animation visually indicating the emergence of the representations from an entry point associated with the first characteristic presented by the first physical object to be performed.

20. The method of claim 11, further comprising:
(a) storing computer readable machine instructions on a computer readable media that when executed by a processor cause detecting when at least one of the first characteristic presented by the first physical object and the second characteristic presented by the second physical object is no longer adjacent to the interactive display surface to be performed; and
(b) storing computer readable machine instructions on a computer readable media that when executed by a processor cause disabling a capability for reassociating the data elements in response thereto to be performed.

* * * * *